United States Patent [19]

Bartkowiak et al.

[11] Patent Number: 4,881,694
[45] Date of Patent: Nov. 21, 1989

[54] YARN TRAVERSING APPARATUS FOR A WINDING MACHINE

[75] Inventors: Klaus Bartkowiak, Herne; Joachim Graf, Remscheid; Friedrich Urbahn, Remscheid; Klaus Weber, Remscheid, all of Fed. Rep. of Germany

[73] Assignee: Barmag, AG, Remscheid, Fed. Rep. of Germany

[21] Appl. No.: 245,001

[22] Filed: Sep. 15, 1988

Related U.S. Application Data

[63] Continuation-in-part of Ser. No. 130,062, Dec. 8, 1987.

[30] Foreign Application Priority Data

| Sep. 16, 1987 | [DE] | Fed. Rep. of Germany | 3731115 |
| Oct. 9, 1987 | [DE] | Fed. Rep. of Germany | 3734235 |
| Dec. 8, 1987 | [DE] | Fed. Rep. of Germany | 3741544 |
| Jan. 27, 1988 | [DE] | Fed. Rep. of Germany | 3802267 |
| Mar. 8, 1988 | [DE] | Fed. Rep. of Germany | 3807535 |
| Apr. 22, 1988 | [DE] | Fed. Rep. of Germany | 3813534 |
| Apr. 22, 1988 | [DE] | Fed. Rep. of Germany | 3813602 |
| May 25, 1988 | [DE] | Fed. Rep. of Germany | 3817639 |
| Jun. 9, 1988 | [DE] | Fed. Rep. of Germany | 3819675 |
| Jul. 8, 1988 | [DE] | Fed. Rep. of Germany | 3823169 |

[51] Int. Cl.⁴ .......................... B65H 54/28
[52] U.S. Cl. .................. 242/43 R; 242/43 A; 242/43 M; 242/43.1; 242/158 B
[58] Field of Search .................. 242/43 R, 43 A, 43.1, 242/158 R, 158 B, 158 F, 158.1, 158.2, 158.3, 158.4 R, 158.4 A, 158.5, 43 M

[56] References Cited

U.S. PATENT DOCUMENTS

| 2,285,439 | 6/1942 | Jones . |
| 2,296,421 | 9/1942 | Campbell . |
| 2,360,909 | 10/1944 | Swanson et al. . |
| 2,415,233 | 2/1947 | Brustowsky . |
| 2,462,060 | 2/1949 | Bartelt . |
| 2,764,363 | 9/1956 | Stammwitz . |
| 2,869,797 | 1/1959 | Clerc .......................... 242/43 R |
| 2,911,835 | 11/1959 | Smith . |
| 3,029,649 | 4/1962 | Steyh . |
| 3,039,708 | 6/1962 | Chidgey, Jr. et al. . |
| 3,061,215 | 10/1962 | Chidgey, Jr. et al. . |
| 3,067,961 | 12/1962 | Chidgey, Jr. et al. . |
| 3,093,344 | 6/1963 | Lamb . |
| 3,097,805 | 7/1963 | Oberly .......................... 242/43 R |
| 3,171,608 | 3/1965 | Speakman .......................... 242/43 R |
| 3,568,941 | 3/1971 | Uelpenich .......................... 242/43 R |
| 3,589,631 | 6/1971 | Jennings et al. . |
| 3,697,008 | 10/1972 | Smith . |
| 3,730,448 | 5/1973 | Schippers et al. . |
| 3,858,818 | 1/1975 | Melz .......................... 242/43 R |
| 4,007,885 | 2/1977 | Hare et al. .......................... 242/43 R |
| 4,204,653 | 5/1980 | Nose et al. . |
| 4,296,889 | 10/1981 | Martens . |
| 4,325,517 | 4/1982 | Schippers et al. . |
| 4,504,021 | 3/1985 | Schippers et al. . |
| 4,659,027 | 4/1987 | Schippers et al. . |

FOREIGN PATENT DOCUMENTS

| 1560387 | 11/1969 | Fed. Rep. of Germany . |
| 1916580 | 10/1970 | Fed. Rep. of Germany . |
| 2205841 | 8/1972 | Fed. Rep. of Germany . |
| 2536296 | 2/1977 | Fed. Rep. of Germany . |
| 2822005 | 11/1979 | Fed. Rep. of Germany . |
| 2320472 | 3/1977 | France . |
| 413448 | 4/1946 | Italy . |
| 432324 | 9/1967 | Switzerland . |
| 433892 | 10/1967 | Switzerland . |
| 523840 | 7/1972 | Switzerland . |
| 968047 | 8/1964 | United Kingdom . |

Primary Examiner—Stanley N. Gilreath
Attorney, Agent, or Firm—Bell, Seltzer, Park & Gibson

[57] ABSTRACT

An apparatus for winding a textile yarn into a cross-wound package is disclosed, in which the yarn is wound about the package at a substantially constant rate while the yarn is guided onto the package by a traversing guide. The apparatus includes a yarn guide means which is reciprocated along a linear stroke path, and means are provided for recovering the kinetic energy of the yarn guide means during its reversal of movement at each end of the stroke path. Several specific embodiments of the yarn traversing guide are disclosed, and in one embodiment the traversing guide includes gripper means mounted on a slide which is positioned between parallel runs of a drive belt, and control means for moving the gripper means to alternately engage the two runs of the belt and thus reciprocate the slide.

33 Claims, 16 Drawing Sheets

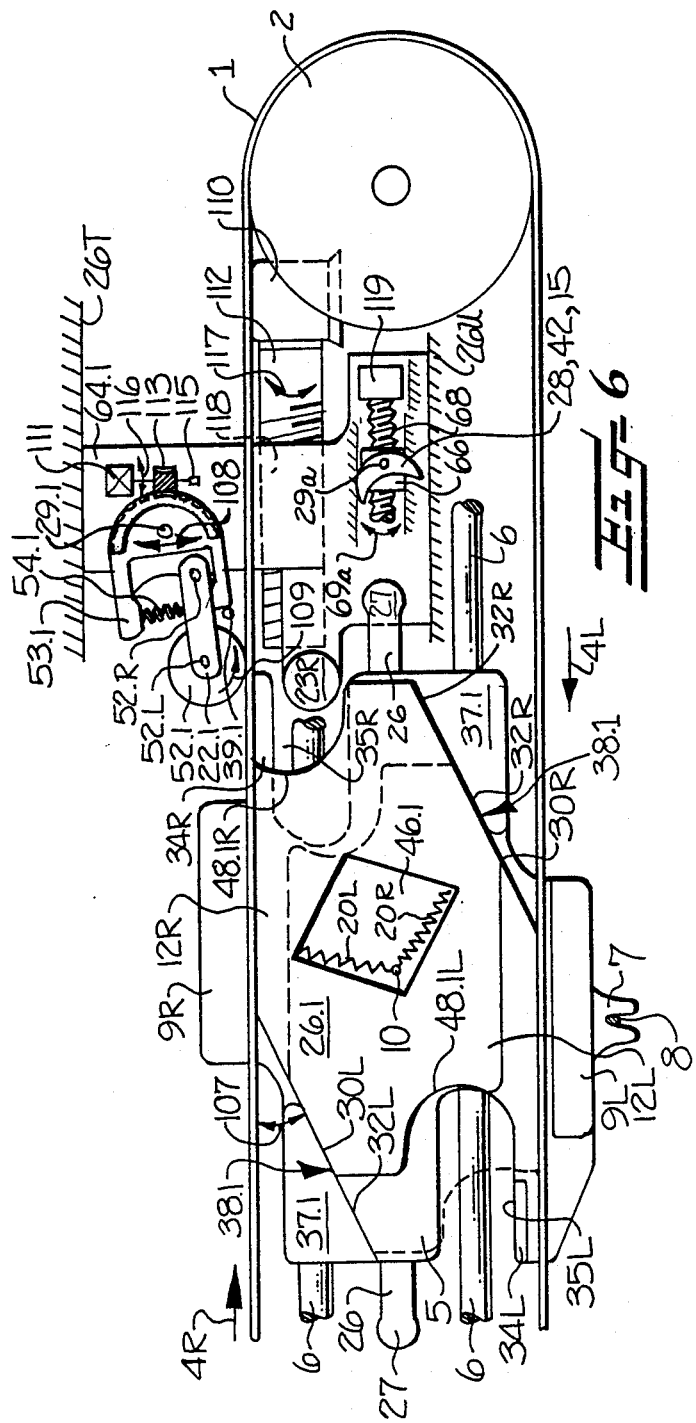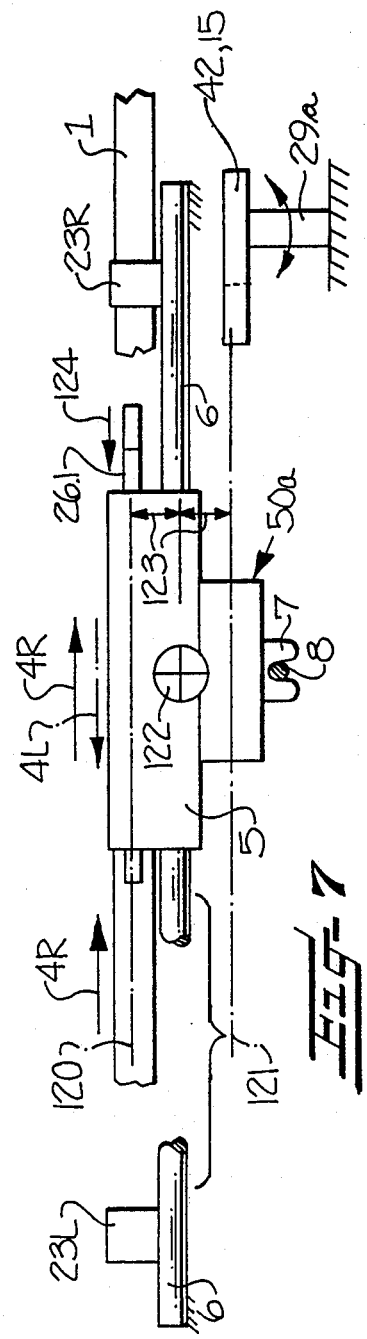

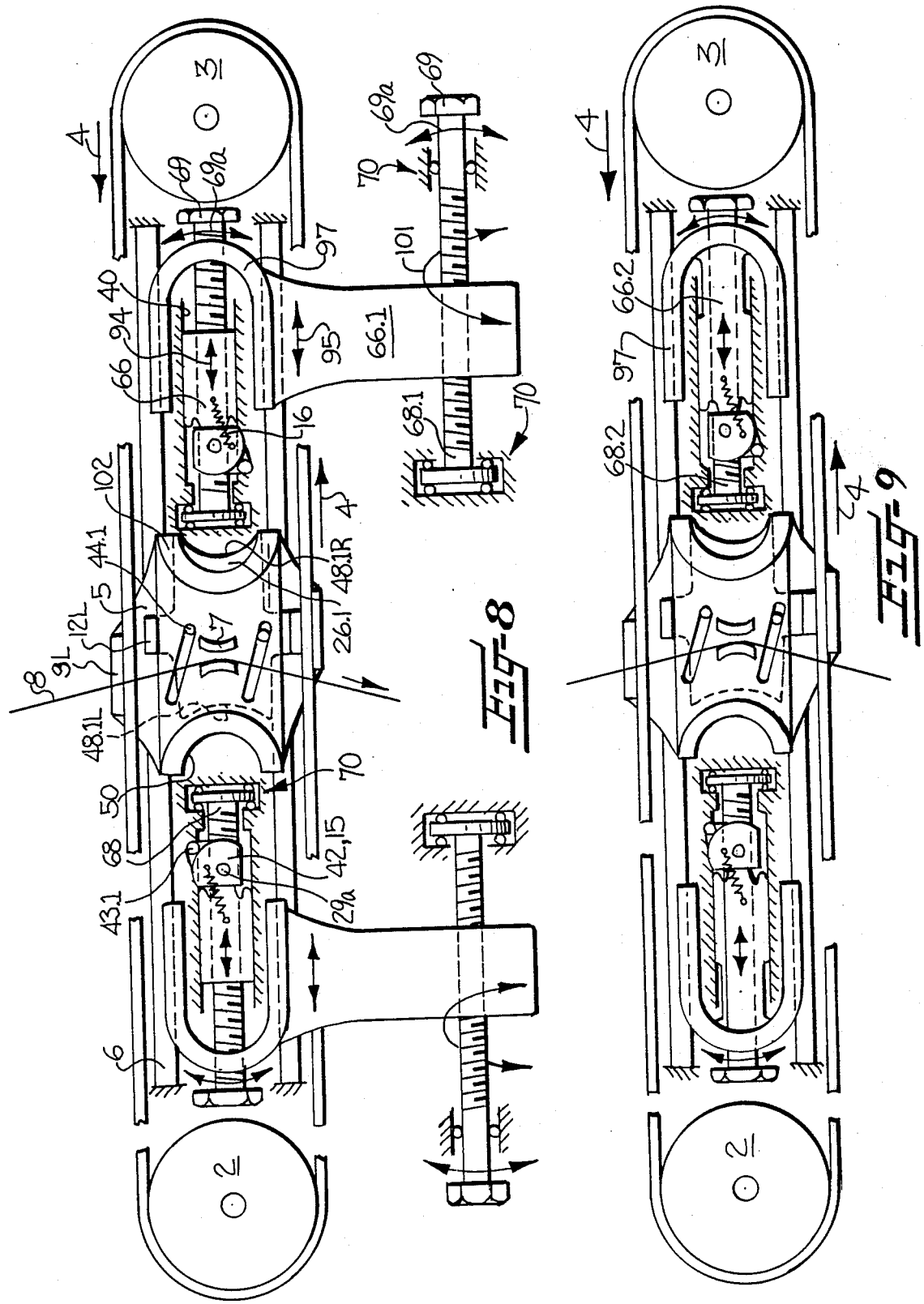

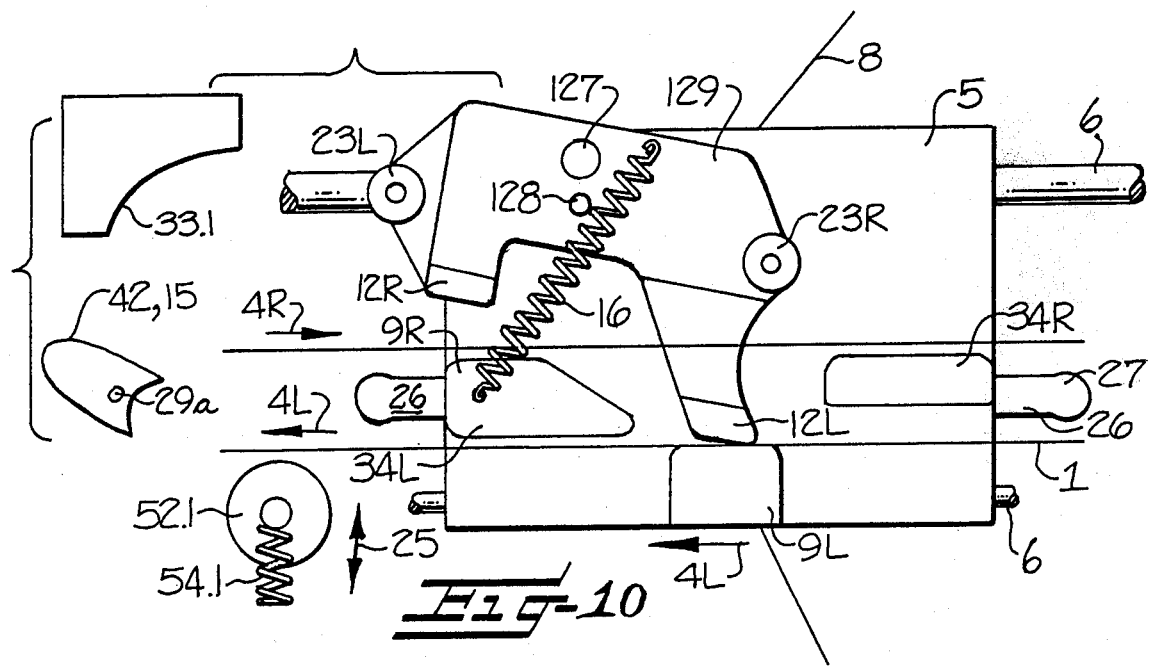
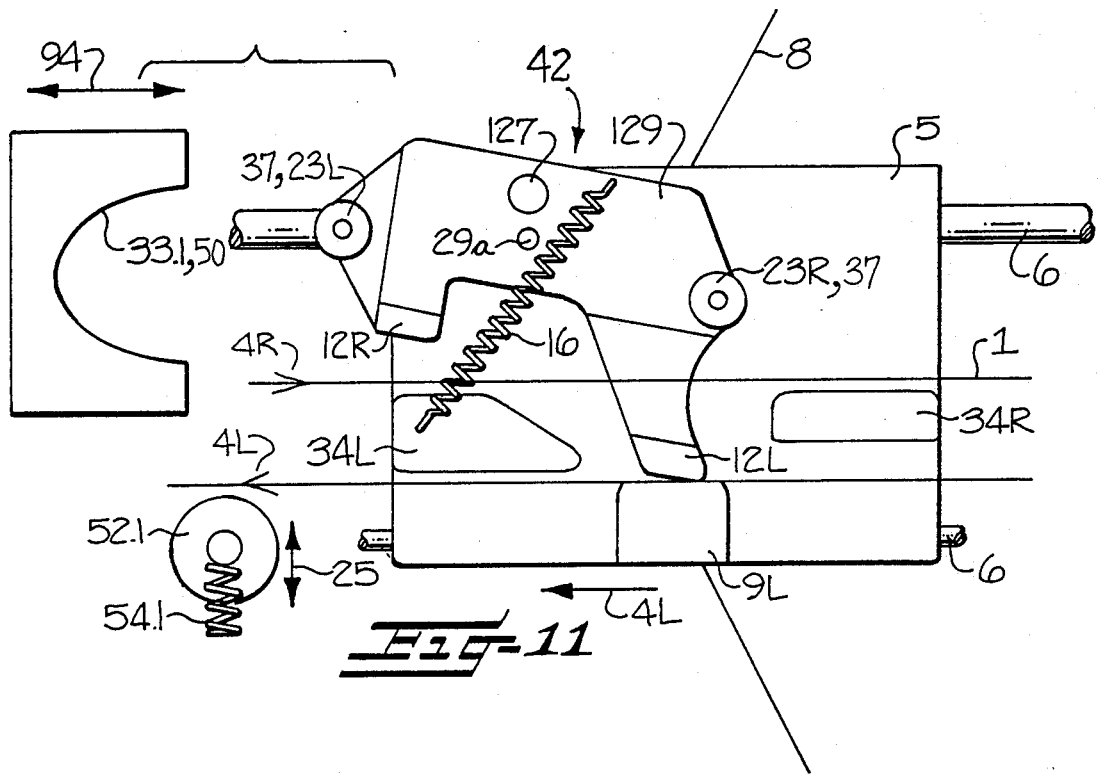

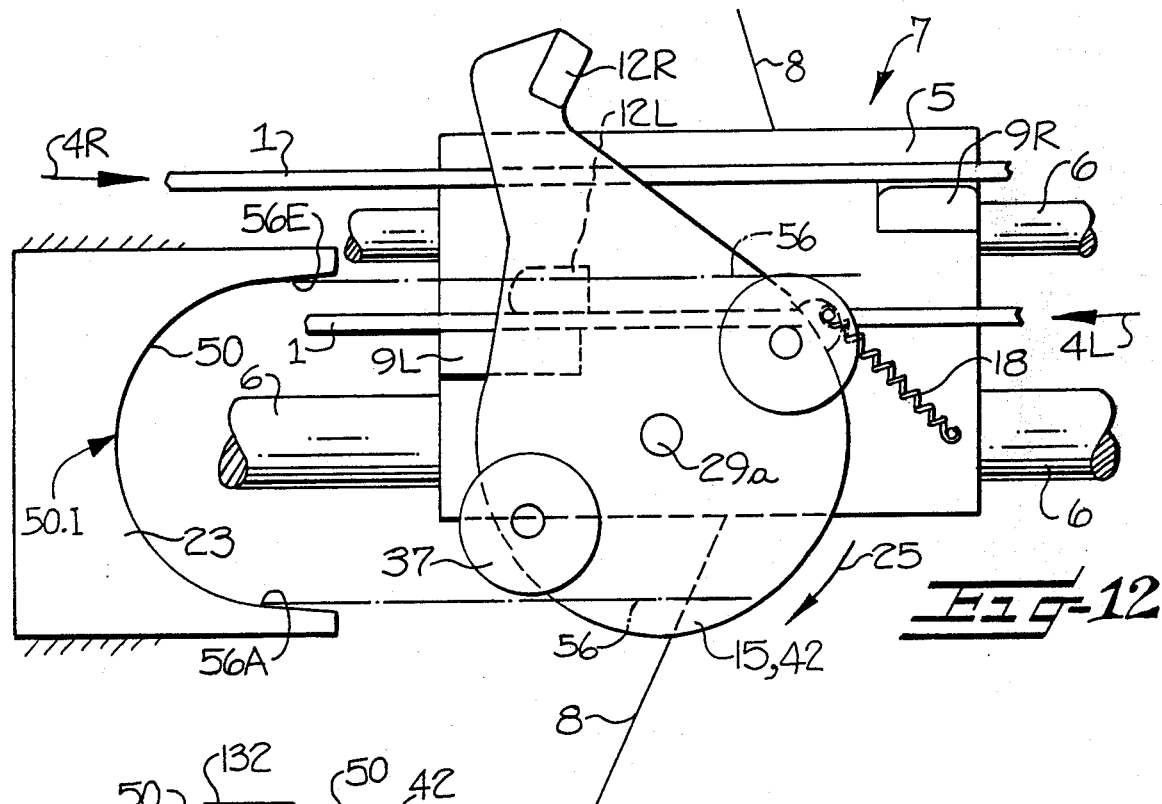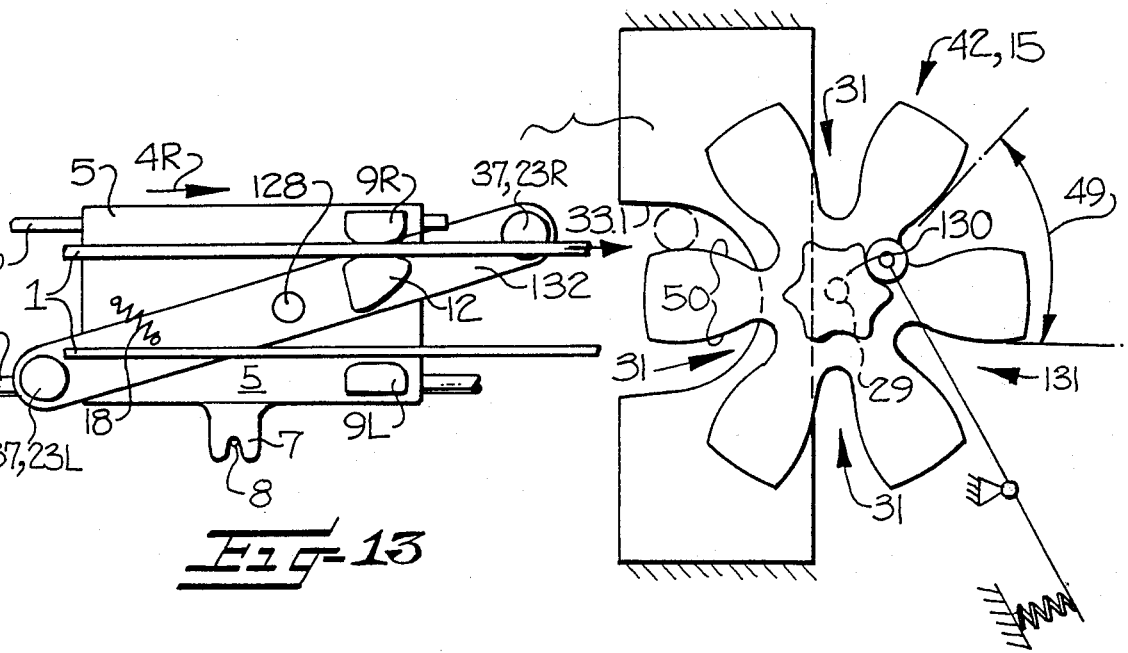

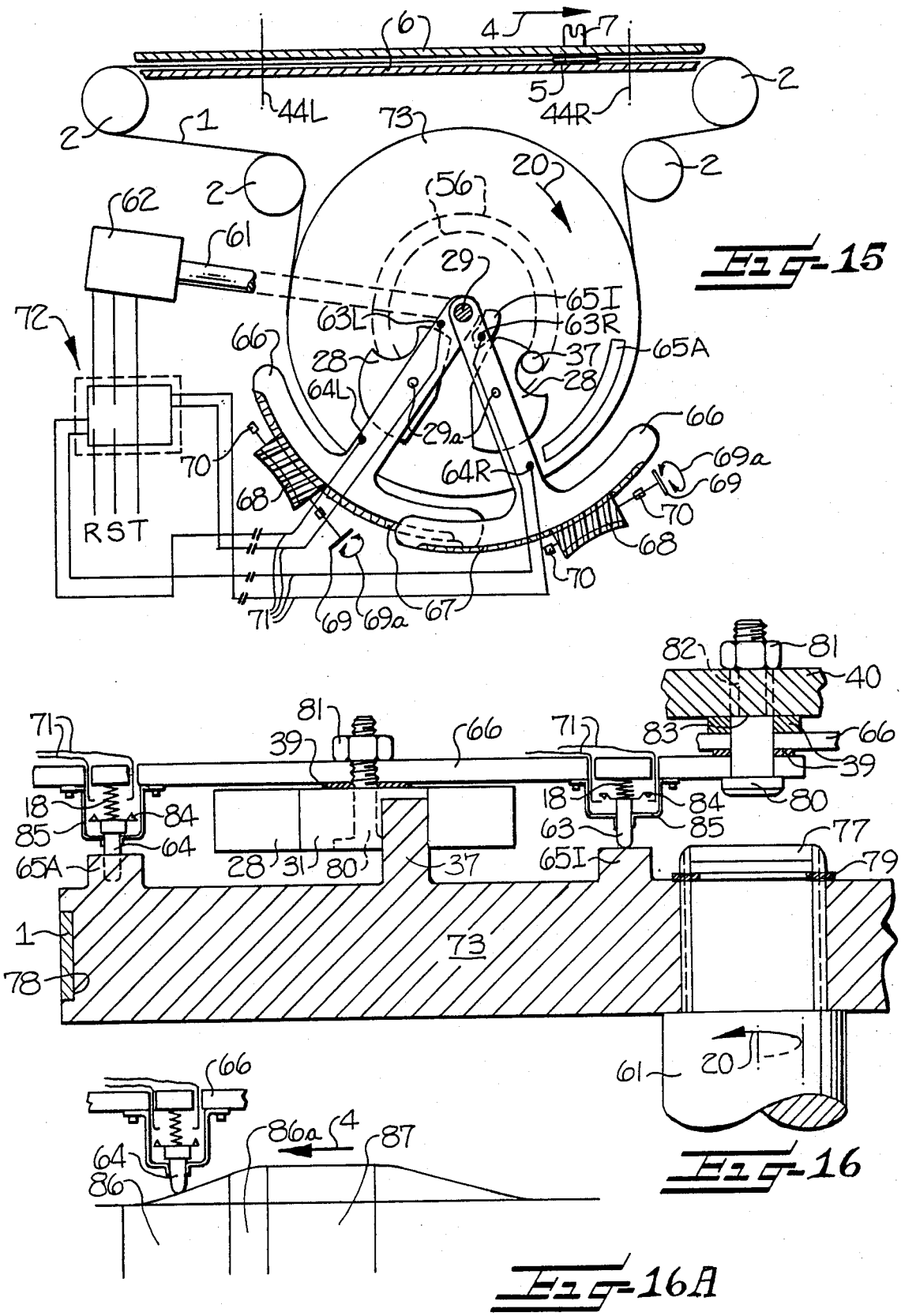

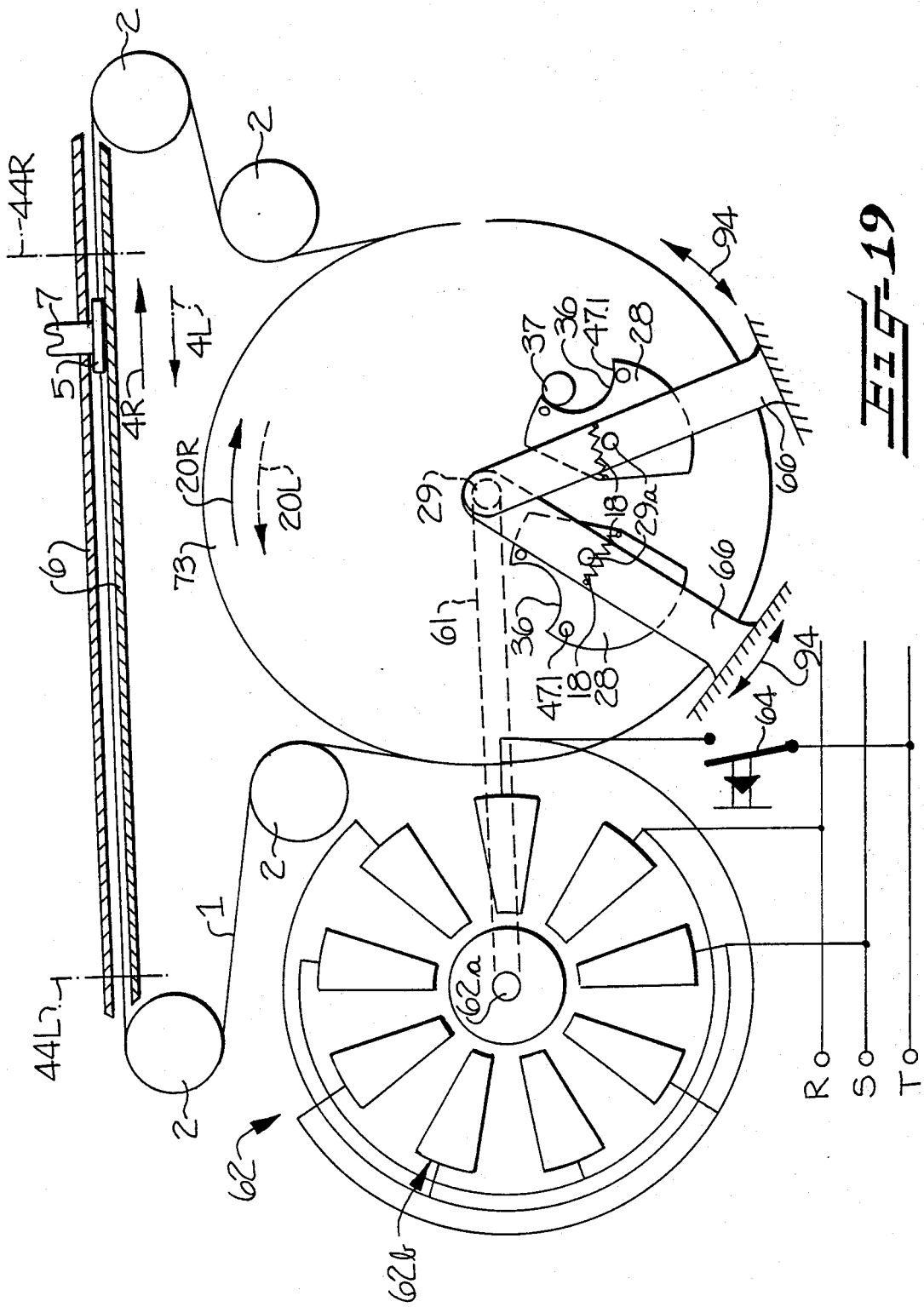

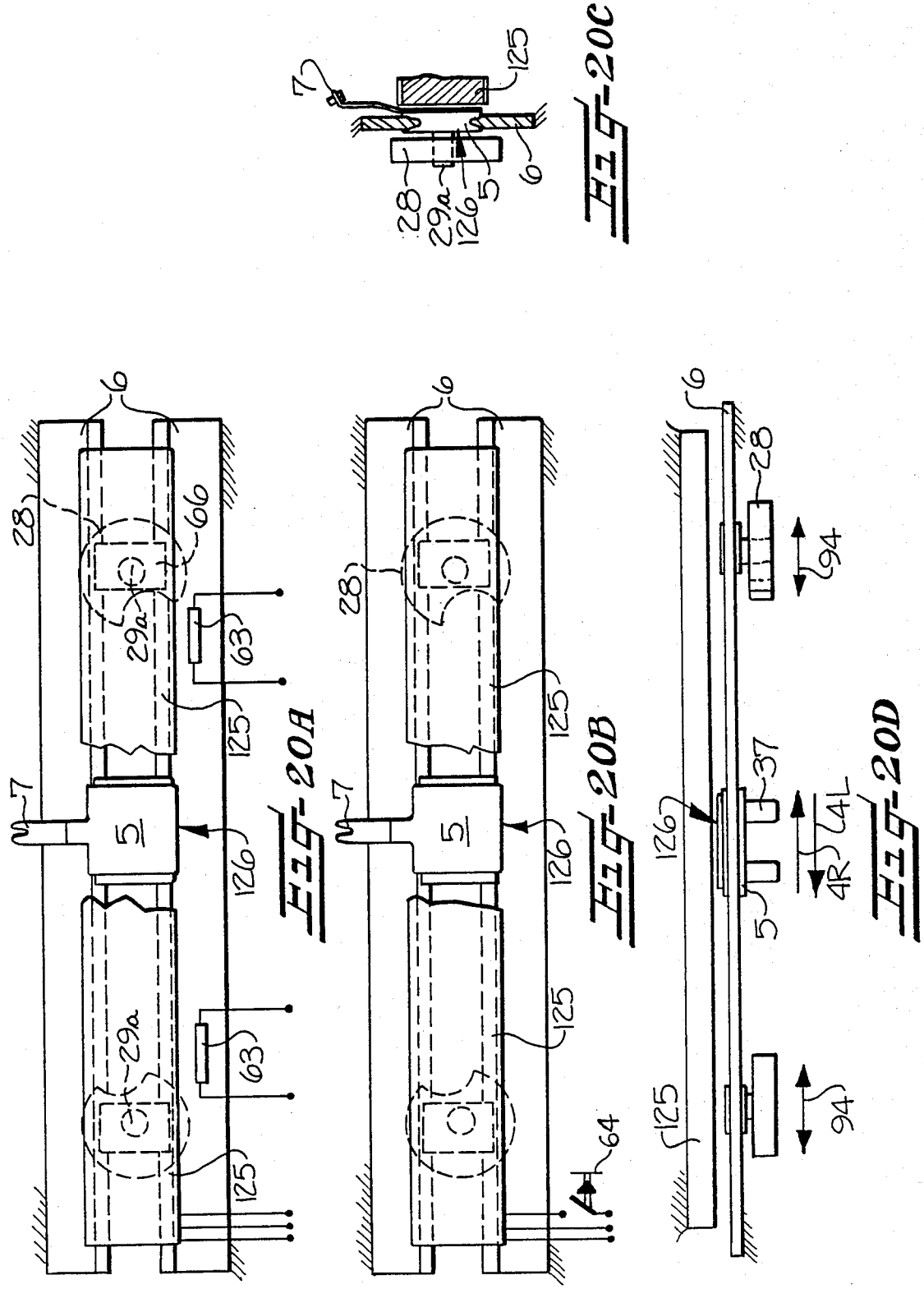

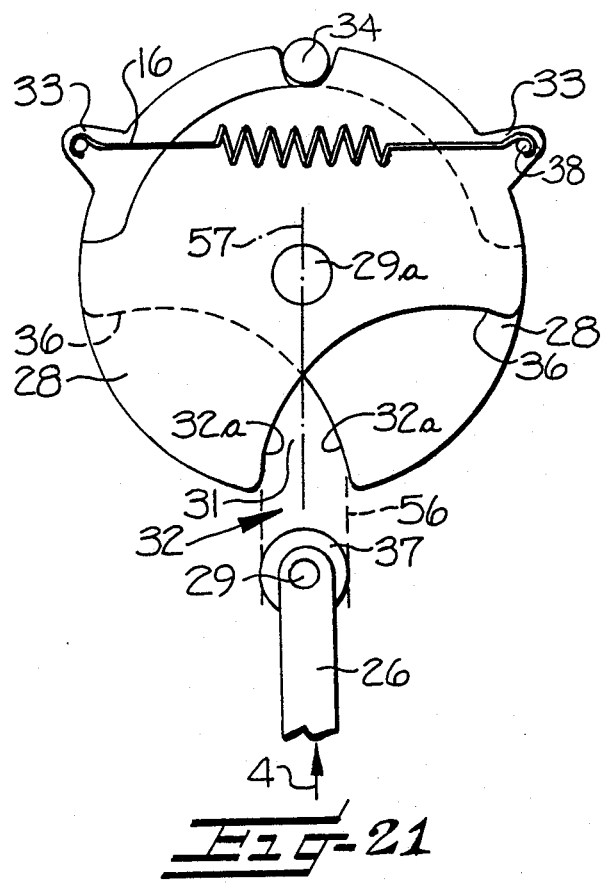
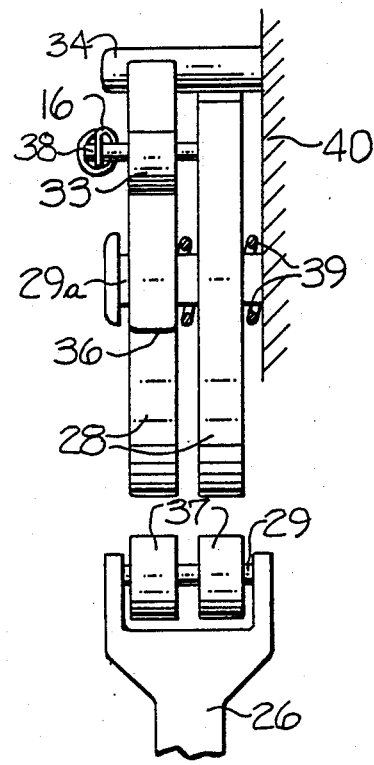
Fig-21   Fig-21A
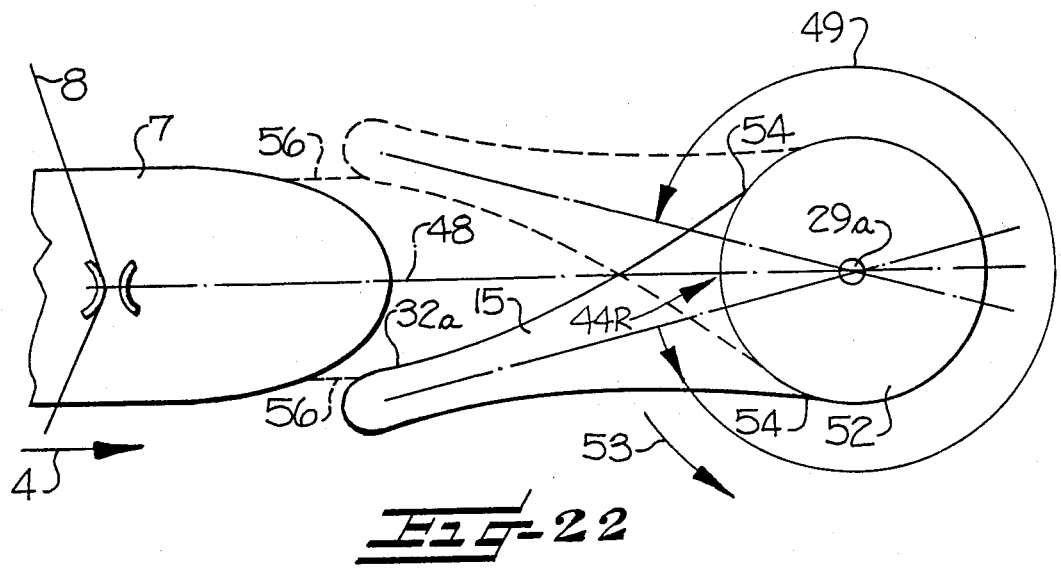
Fig-22

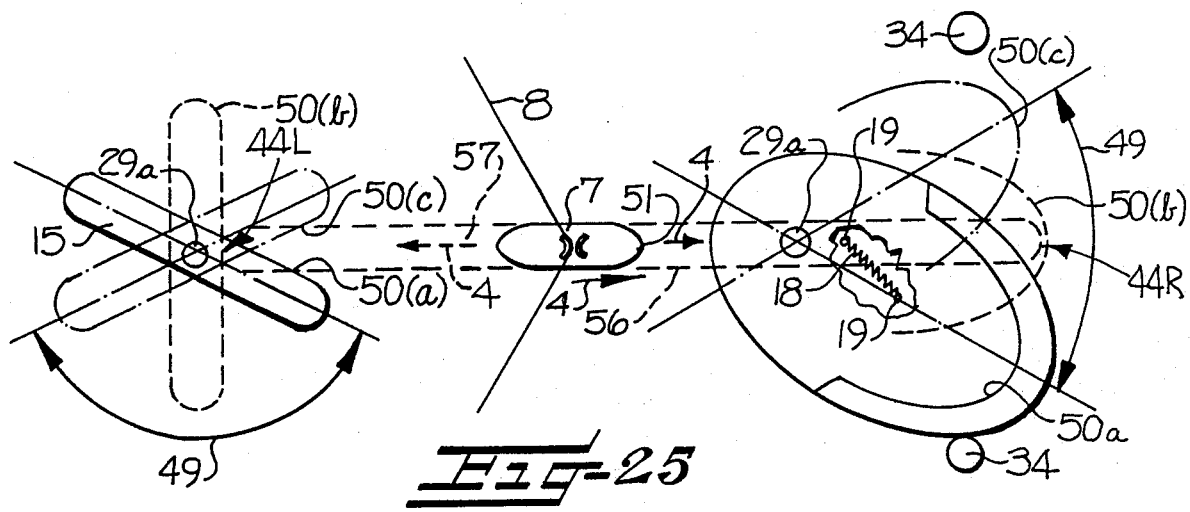
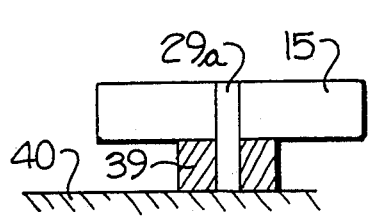
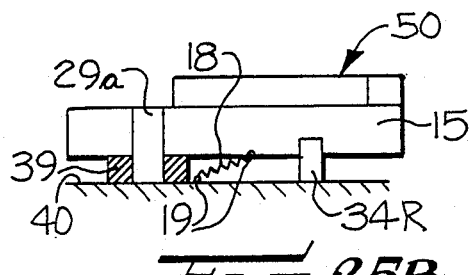
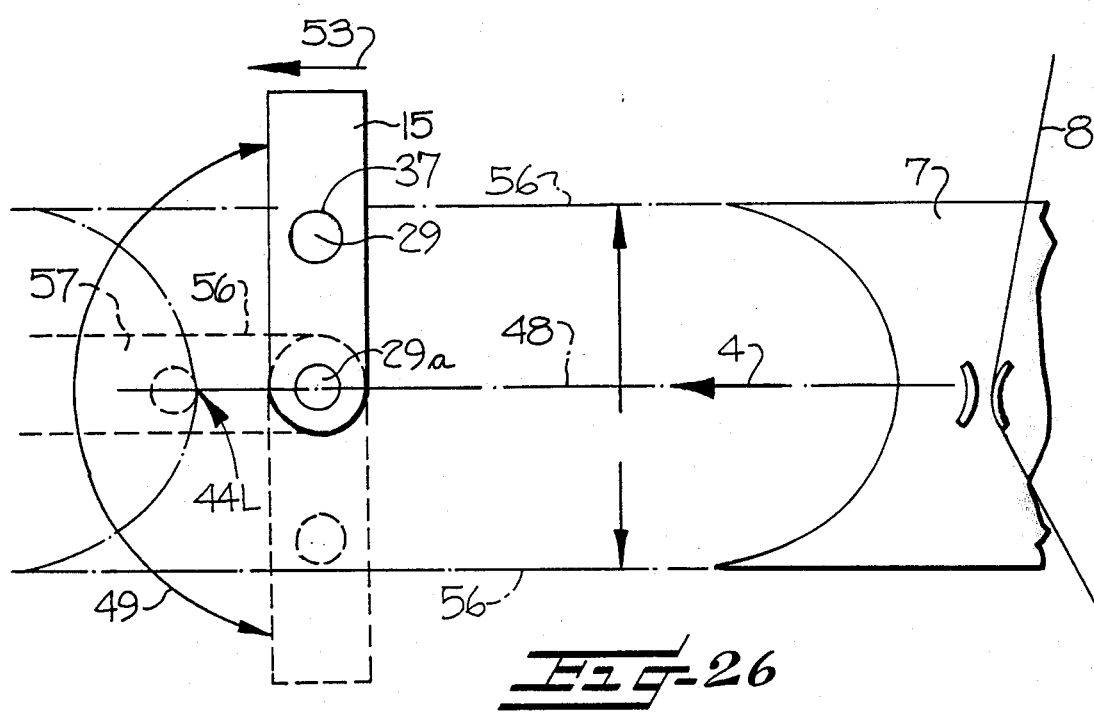

YARN TRAVERSING APPARATUS FOR A WINDING MACHINE

CROSS REFERENCE TO RELATED APPLICATION

This is a continuation-in-part of copending application Ser. No. 130,062, filed Dec. 8, 1987.

FIELD OF THE INVENTION

The present invention relates to a yarn traversing apparatus adapted for guiding a running yarn onto a rotating core to form a core supported package and which is characterized by the ability to recover the kinetic energy of the yarn guide means during its reversal of movement at each end of its stroke path.

BACKGROUND OF THE INVENTION

In the present application, the phrase "yarn guide means" describes those moved parts, including the traversing yarn guide, of a winding apparatus, which are so connected with the yarn guide, that they are all reversibly driven simultaneously with the yarn guide. Whereas the traversing yarn guide performs primarily a straight-line oscillating motion along the traversing stroke and transversely to the direction of the advancing yarn, and reverses its traveling direction in each stroke end, the other components of the yarn guide means, in particular the drive elements for converting the rotation of the drive, may also rotatably oscillate about a rotational axis. In so doing, they each reverse their direction at the stroke ends of the guide means. The term "yarn guide means" also describes the transmission elements, connecting elements, drive elements, etc. for the yarn guides of a winding apparatus with a plurality of winding positions, which are driven by a common drive, and which reverse with the yarn guides.

A winding appartaus as described above is disclosed in Swiss Pat. No. 432,324. The yarn guide, which is axially reciprocated between the ends of the traverse stroke by a drive eccentric, is braked by springs in the area of the stroke ends and again accelerated assisted by spring tension. To this end, the springs must each be differently biased with respect to the adjusted speed of the winding apparatus, so as to recover at the stroke reversal the kinetic energy of the yarn guide in precisely predetermined reversal points, as required in a winding machine.

DE-OS No. 25 36 296 discloses a winding machine wherein pistons are mounted on the yarn guide which is reciprocated by a cross-spiralled roll. These pistons immerse in stationary cylinders in the area of the stroke ends. In so doing, the air in the cylinders primarily escapes for the purpose of damping. However, it is also compressed in part for the purpose of recovering energy. The loss of energy results from the escaping air.

It is according an object of the present invention to improve the known yarn traversing apparatus so that the kinetic energy of the reversibly moved yarn guide means, which includes the yarn guide, can be recovered at the reversal of the motion, irrespective of the speed of the winding apparatus and without any adaptation to its speed.

SUMMARY OF THE PRESENT INVENTION

The above and other objects and advantages of the present invention are achieved in the embodiments illustrated herein by the provision of a yarn traversing apparatus which comprises a machine frame, yarn guide means including a yarn guide, means mounting said yarn guide means to said frame for back and forth movement along a linear stroke path, drive means for moving said yarn guide means back and forth along said stroke path, and energy recovery means for recovering the kinetic energy of said yarn guide means during its reversal of movement at each end of the stroke path. The energy recovery means of the present invention comprises (a) mass means movably mounted to one of said frame and said yarn guide means, (b) contact means mounted to the other of said frame and said yarn guide means and (c) cooperating surface means on the mass means and the contact means for providing a positive drive connection therebetween during each reversal of movement of the yarn guide means and so as to transmit kinetic energy from said yarn guide means to said mass means as the yarn guide means approaches each end of said stroke path to thereby impart movement to said mass means, and then retransmit the resulting kinetic energy from said moving mass means to said yarn guide means to thereby cause said yarn guide means to move away from each end of said stroke path.

An advantage of the present invention is that the kinetic energy of the yarn guide means is maintained at the reversal of the motion, and yet the reversal point is precisely determined. Another advantage is that the kinetic energy of the yarn guide means can be also recovered irrespective of the type of drive. For this reason, the invention can be utilized in a winding apparatus with continuously rotating drive, such as, for example, a cross-spiralled roll. It may, however, also be used for a drive operating in alternating directions, such as two oppositely moved, parallel runs of a belt. A further advantage of the invention is that a simple and inexpensive structure enables the recovery of energy of the yarn guide means in the motion reversal areas which is particularly of advantage where a common drive is provided for the operation of a plurality of winding positions on a winding machine.

The positive drive connection between the mass means and the contact means is analogous to the positive engagement of meshing gear teeth, and as a result, it is accomplished for the first time, that the motion of the yarn guide means and the motion of the movable mass occur along predetermined paths at such interdependent speeds, that the kinetic energy of the yarn guide means and the kinetic energy of the movable mass, one being opposite to the other, are dependent on each other.

The mutual exchange of energy between the mass and the yarn guide means may be continuous or discontinuous. Thus, for example, the mass can be put in motion by the stop via an elastic shock, whereby the yarn guide means transmits its kinetic energy. After the mass is deflected on the guide path of a cam member, it retransmits its kinetic energy, via an elastic shock, to the yarn guide means, whereby the same is accelerated for its return motion. To realize a continuous exchange of energy, a drive connection is established in the motion reversal area between the mass and the yarn guide means by means of the stop, through which the yarn guide means and the movable mass effect an exchange of energy with each other.

In one embodiment, the mass performs a pivotal motion or a rotary motion. The mass can also be movable crosswise, for example, in a straight line which is transverse to the traveling direction of the yarn guide means.

The mass used for each reversal of motion may be mounted to the machine frame. However, it may also be a part of the yarn guide means. The stop must then be opposed to the mass and be arranged stationarily on the frame in the motion reversal area.

It is known from the German Offenlegunsschrift No. 22 05 841 to produce a reflection of a traversing member by an elastic buffer, which contacts a stop freely suspended in the stroke reversal areas. In this case, it is necessary to provide the stop with a corresponding greater mass, so as to use for the reflection the kinetic energy which is freed upon the braking of the yarn guide means. However, this type of energy storing means requires likewise an adaptation of the reflector elements to the speed of the traverse motion and is dependent on the pendular frequency of the freely suspended stop. The present invention, however, has recognized that an energy storing means, which need not be adapted to the traversing speed, in particular, when a traverse stroke must be strictly maintained, can be realized when the kinetic energy of the guide means is transmitted as kinetic energy to the mass without changing the form of energy and is stored as kinetic energy in the mass. As a result, the kinetic energy of the storing mass increases as the kinetic energy of the yarn guide means decreases, and vice versa, i.e., the kinetic energy of the energy storing means and that of the yarn guide means depends oppositely on each other at the reversal of the motion. An advantage of this construction is that the initial and final end positions of the mass can be so determined that the end position, which the mass assumes after a reversal of the motion, is the initial end position for a subsequent stroke change. As a result, it can be accomplished that the winding machine is particularly suitable for an operation at high double stroke speeds, since after a reversal of motion the masses are automatically again in their initial position and need not be returned to their initial position. The cooperating surfaces on the mass and its engaging member determine the path of the mass between its two positions.

In one embodiment, a rocking lever cooperates with a stop positioned on the traversing yarn guide means in such a manner that, upon the entry of the stop the braking force becomes operative, at a distance on one side of the axis of rotation, as a torque on the rocking lever. As a result, the mass of the pivot lever is set in motion, and after the reversal the motion of the rotating lever mass is returned, on the other side of the axis of rotation, as an accelerating force to the yarn guide means. When the two positions of the rocking lever are symmetrical to each other with respect to the traveling direction of the yarn guide means it is realized that the final position after a reversal of motion becomes the initial position for a subsequent stroke change.

In another embodiment, a rocking lever is pivotally supported as the stop and has a free end, and the free end mounts a slide block in the form of a roller. The mass and the slide block of the rocking lever interact positively with the traversing yarn guide means in the stroke reversal areas. This embodiment has the advantage that a continuous exchange of energy can occur between the yarn guide means and the mass, since they are positively coupled in the stroke reversal areas. Thus, during the exchange of energy, the relative motion between the mass and the yarn guide means is controlled by the continuous pivotal motion of the lever.

In the above embodiment, the slide block of the rocking lever may be forcedly guided along a concave guide edge on the adjacent end of the traversing yarn guide means. This embodiment may be preferably used, if the rocking lever must control certain switching functions. For example, the rocking lever may serve as a drive for movable pairs of clamps, which alternate in clamping against oppositely moved runs of a belt.

The guide edge is preferbly designed and constructed so that it extends at an angle less than 90°, and preferably parallel to, the traversing direction, at both the location initially contacted by the slide block of the rocking lever and the location at which the slide block leaves the guide edge. This construction permits a continuous exchange of energy between the mass and the yarn guide means. Also, as a result of the geometry of the guide edge and the engaging slide block of the rocking lever, the slide block may be accurately guided during the reversal time. This is accomplished in that the forced motion, i.e., the controlled motion of the slide block along the guide edge, determines the time-traverse law of the reversal motion. Another advantage is that the geometry of the guide edge and the slide block permits the speed-traverse law of the reversal of motion of the yarn guide means to be determined, so that an optimal, mutual exchange of energy is also possible between the mass and the guide means. In determining the geometry, it should be considered that the relative motion must each time occur in such a manner that no self-locking occurs between the slide block end and the guide edge.

Another advantage of this embodiment results in that the motion of the yarn guide means can be absorbed shockfree, and consequently, without an energy loss and without wear and tear. This is particularly true during the entry into the areas of the motion reversal, and where the guide edge extends in the initial and final positions parallel to the travel direction of the guide means.

The travel direction of the yarn guide means extends along the path which the yarn guide means covers between its stroke ends. The travel direction may extend both straight and curved, depending on whether the yarn guide means is reciprocated in a straight line or is rotated.

In another embodiment, the mass is a component of each rocking lever, and the free end of each rocking lever includes a slide block for engaging the guide edge of the yarn guide means. The axes of rotation of the lever arms are perpendicular to the direction of the path of travel of the yarn guide means. This embodiment can be realized simply and inexpensively, and requires very little space. The distance of the axis of rotation from the travel direction of the yarn guide means as well as the location of the axis of rotation with respect to the stroke ends of the yarn guide means and the geometry of the guide edge and the slide block on the lever arm are interdependent. Here again, the slide block must be able to enter and leave the guide edge without the occurrence of a self-locking.

Different embodiments of a guide edge as well as arrangement of the axis of rotation with respect to the stroke end, which is determined by the guide edge, are possible. Preferably, the distance of the guide edge from the axis of rotation of the lever arm assumes a minimum value between the ends of the guide edge, which is advantageously so arranged that the yarn guide does not dwell at the stroke end. In this event, the minimum distance occurs only at one point along the guide edge.

In a further embodiment, the mass is a carriage mounted at each end of the stroke path, and the carriage is guided along a linear, preferably straight, path which extends transversely to the travel direction of the yarn guide means. The carriage includes a slide block or follower for engaging the guide edge on the adjacent end of the yarn guide means, and into which the follower moves. The follower enters at one lateral side of the guide edge, and leaves the same at the other lateral side. Here again, the shape of the guide edge can be designed according to the preferred speed-traverse law of the yarn guide in the areas of the motion reversal. Depending on the path of mass, different shapes result for the guide edge, that shape being preferred, which enables an optimal exchange of energy at the reversal of the motion. As a measure for the reversal time of the yarn guide means, the depth may be employed at which the follower immerses into the guide edge, when viewed in the travel direction of the guide means.

Another advantage of the present invention is that, without impairing the function, either the mass or the pertinent stop may be provided with the guide edge or the follower, respectively.

In one embodiment, a mass is movably supported at each of the ends of the stroke path, and the yarn guide means mounts an associated stop for engaging the movable mass. This embodiment is advantageous when the invention is intended to be used for a winding machine with a plurality of winding positions and yarn guide means. As a result, the constructional expenditure is kept very low and yet energy is recovered for all yarn guide means irrespective of the speed.

The mass may alternatively be supported on the traversing yarn guide means so as to be movable relative thereto, with the stops being arranged at the ends of the stroke path. This embodiment is advantageous where a belt traversing system is employed, since the normally high constructional expenditure can be greatly simplified. To this end, embodiments are disclosed, in which normally several moved parts, such as, for example, the belt gripper means, are replaced with a single, movable part, i.e., the movable mass, which fulfills the function of both the energy storing means and the belt gripper means.

The mass of the energy storing means may take the form of a number of components, with each component being guided for movement in the direction opposite to the direction of movement of the other components. This embodiment has the advantage that the component forces resulting the braking and accelerating forces compensate for each other transversely to the travel direction of the guide means, so that no additional, i.e., in particular, lateral support needs to be provided for the yarn guide means. As a specific embodiment, one half of the mass may consist of two movable members, with the other half being positioned preferably between such two movable members. In this case, the torques of the transverse forces also compensate for each other.

Each mass is preferably held by a biased spring against a boundary stop in each of its initial and end positions, and the spring is operative so that it passes through its dead center position having its maximum spring force during the movement of the mass between its initial and end positions. This embodiment is especially advantageous for the startup of a winding machine from a standstill. At a startup, the yarn guide means have mostly not yet reached their final speed, so that depending on the kind of drive the yarn guide means does not reach the stroke end. The present feature allows the traverse motion to reverse, irrespective in which of the two positions the mass is located, when the yarn guide means moves into the area of the motion reversal. By the contact of the mass on the boundary stop it is accomplished that the mass assumes always its accurately defined initial or final position, i.e., even after a motion reversal of the guide means at a low speed. In the case of the divided mass as described above, a spring also may be employed for tensioning a plurality of masses.

The drive means for moving the yarn guide means back and forth along its stroke path may take various forms, and preferably, in the motion reversal areas the drive is disengaged relative to the traversing system. The reversal of the yarn guide means occurs in the areas of the motion reversal with the aid of the movable masses, so that while different drive speeds may be used, the kinetic energy can yet be recovered without having to adapt the energy storing means to the drive speed. A suitable drive is, for example, a continuously rotating cross-spiralled roll, in which the drive groove is widened in the ends in such a manner that the yarn guide, together with the other components of the yarn guide means, are disengaged from the groove in the motion reversal areas, i.e., they float freely, and change their direction of motion while maintaining the kinetic energy. In another embodiment, a pair of oppositely moved, parallel belt runs, against which the yarn guide means are alternately clamped, serves as a drive. The yarn guide means freely floats temporarily between the disengagement from the one belt run and the engagement with the other belt run, and it is then reversed by the movable mass.

An embodiment particularly suitable for winding machines with a plurality of winding positions employs a drive composed of a belt having oppositely directed, parallel runs. Thus, for example, one endless belt may be used to drive the yarn guide means of a plurality of winding positions. Yet, the kinetic energy of the yarn guide means is recovered at each reversal of the motion during the time, in which the yarn guide means are each disengaged from their pertinent belt runs. After the yarn guide means have reversed their travel direction while receiving energy, they have again the speed of the belt and can be easily clamped against the returning run of the belt.

In one disclosed embodiment, the movable mass is the single movable part arranged on the yarn guide means, and it assumes both the function of storing energy and the function of alternating gripping the belt runs. Thus, the movable mass is the drive for the alternately operable belt gripping means. The required size of the mass is substantially dependent on the entire mass of the yarn guide means, the highest possible speed at which the storing mass can be moved, and the greatest possible acceleration to which the yarn guide means and the storing mass can be subjected. The required size of the mass is to be determined or respectively optimized by test, if need be.

The kinetic energy of the mass may be used in part to force the belt clamping means to an accelerated engagement and/or to use the belt clamping means also for the exchange of energy. Embodiments are described below, for example with respect to FIG. 28.

An auxiliary drive may be provided in each of the motion reversal areas, and which operates the traversing systems at the end of the stroke path when they are disengaged from the drive and until the reversal of the motion. The use of such auxiliary drives has the advantage that at the startup of the belt runs the belt clamping means is caused in any event to reverse from any position, in particular from a position shortly before their stroke end. The auxiliary drives may be installed stationarily as well as be adapted to be optionally moved by a suitable drive to the run of the belt or removed from same. Another advantage in connection with the movable masses results in that the supplementarily applied driving energy is likewise transmitted to the movable masses and consequently remains. As a result of these features, the kinetic energy can be recovered at the reversal of the yarn guide means without a disadvantage, and yet the yarn guide means can be moved right to the ends of the traverse stroke, also at the startup of the belt runs. The drive may cooperate with same both contactless and mechanically while contacting the guide means.

The traversing system may alternatively comprise a motor, the running direction of which is reversed at each of the motion reversal areas. This embodiment has the advantage that also the reversibly moved parts of the drive, which include, for example, the rotor of a motor, change their travel direction at each reversal while receiving the kinetic energy. As a result of the movable masses, a plurality of different drives, such as electric motors, can now be used for the operation at high traversing frequencies, which drives have previously not been suitable for the operation at high traversing frequencies due to their large mass and the long braking distance connected therewith.

The drive may be temporarily disconnected in the areas of the motion reversal. This accomplishes on the one hand that the yarn guide means, including the drive, can be reversed, while floating freely and receiving the kinetic energy, and on the other hand time is made available for reversing the drive means.

The drive may comprise an electric motor, which has no preferred running direction, and the rotors of which form part of the yarn guide means. Such a motor maintains its once-adjusted running direction until it is reversed to the other direction. An advantage is that such a drive is suitable for very high traversing frequencies, which results from the fact that the electromagnetic field does not break down in the areas of the motion reversal within the shortest time and must then be rebuilt in the opposite direction. For this purpose, one embodiment uses an a.c. motor, which has for each of its two directions electromagnetic fields similar to each other with identical succession of phases.

The motor may be designed and constructed as a linear induction motor, the stator of which is at least as long as the traversing stroke, and the rotor of which is fixedly mounted to the yarn guide means. This embodiment has the advantage that very simple guide means can be used to convert the movement of the motor to the substantially straight-line movement of the yarn guide. As stated above, the yarn guide may be attached directly to the rotor of the linear induction motor. However, if the motor serves to drive the yarn guides of a plurality winding positions, a rod may serve as a transmission element, which fixedly connects the yarn guides of several winding positions with the rotor of the motor.

The drive means for the yarn guide means may comprise a reversibly movable belt and a belt pulley associated therewith, with the belt pulley being reversibly driven. The circumference of the belt pulley is sufficiently large so that its angle of rotation is less than 360 during one stroke of the traversing system. Also, the mass and the associated stop are mounted on the belt pulley, or in the area adjacent the ends of the rotation. In one embodiment, the belt is tensioned around the belt pulley. In another embodiment, the motor drives simultaneously all yarn guides of a winding machine with a plurality of winding positions, and the yarn guides are interconnected by means of the belt. An advantageous result here is that an energy storing means and an associated stop need to interact only in the stroke ends of one of the yarn guide means for the purpose of recovering the energy of all yarn guide means, which include, in particular, also the transmission elements between the drive and the yarn guides of the individual winding positions.

The energy storing means, or the stops, may be mounted in the motion reversal areas on supports which are movable in the traveling direction of the traversing system, by means of a stroke adjusting device. Thus the traverse stroke, i.e., the distance between the stroke ends of the yarn guide, is adjustable during the operation. Such an adjustment of the traverse stroke is described as a stroke modification provided it occurs during the traversing operation. The meaning and purpose of a stroke modification may, for example, be obtained from the subject matter of the German Pat. No. 19 16 580.

BRIEF DESCRIPTION OF THE DRAWINGS

Some of the objects and advantages of the invention having been stated, others will appear as the description proceeds, which considered in conjunction with the accompanying drawings, in which

FIGS. 2-15, 18, 19, and 28 are similar views of additional embodiments of the yarn traversing apparatus of the present invention;

FIG. 13A, is a fragmentary side elevation view of the energy recovery mass shown in FIG. 13;

FIG. 16 is a fragmentary sectional view of the belt drive pulley shown in FIG. 15;

FIG. 16A is a schematic diagram illustrating the engagement between the switch and control post shown in FIG. 16;

FIGS. 20A and 20B are schematic views of embodiments employing a linear induction drive motor, with FIG. 20C being a sectional end view of FIG. 20B and FIG. 20D being a side elevation view of Figure 20B;

FIGS. 21 and 21A are front and side views respectively, of one embodiment of the energy recovery mass of the present invention;

FIGS. 22-27 are front views of additional embodiments of the enery recovering mass of the present invention;

FIGS. 25A and 25B are side views of the energy recovery masses of FIG. 25.

DETAILED DESCRIPTION OF THE PREFERRED EMBODIMENTS

Figure 1:
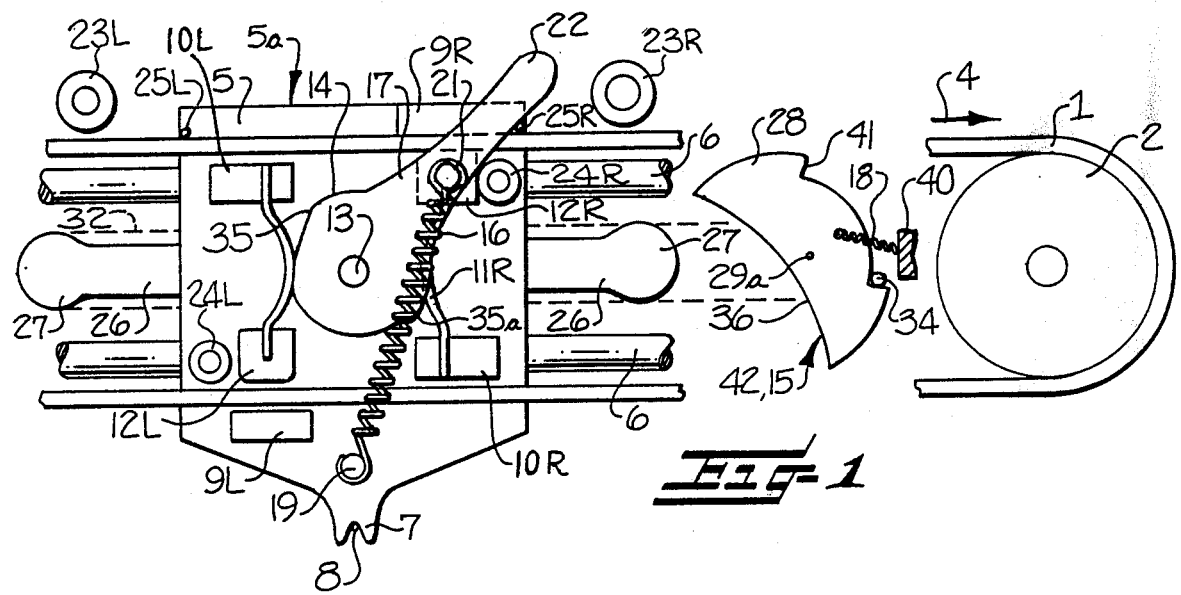
FIG. 1 is a somewhat schematic plan view of a yarn traversing apparatus which embodies the features of the present invention.

Referring initially to the emobdiments of FIGS. 1-13, several embodiments of a yarn traversing apparatus are disclosed wherein the drive includes a revolving endless belt 1 (FIGS. 1-9) which runs in direction 4. In other embodiments, two constantly moved, oppositely directed runs of the belt are provided (FIGS. 10-13, 28) which have a running direction 4R and 4L. If one revolving endless belt is used (FIGS. 1-9), the belt is tensioned between two pulleys 2, 3 both having the same size. Shown is only the pulley which pertains to the end shown, and a pulley of the same size will then pertain to the stroke end not shown. A yarn guide 7 is mounted on a slide 5, and the slide moves in straight guideways 6 parallel to the two runs of the belt. Guided by the yarn guide 7 is a yarn 8, which advances in some of the embodiments perpendicular to the plane of the drawing (FIGS. 1, 6, 7, 13), and parallel to the plane of the drawing in the other Figures. Attached to the slide 5 is a switching mechanism for actuating a belt clamping or gripper means. The switching mechanism comprises, for example, a control disk or lever 17 (FIG. 1) or a plate-shaped gripper support (FIGS. 3-9), which is obliquely guided with one direction component in the direction of movement of the slide, or a rocking lever rotatable about an axis 128 (FIGS. 10, 13, 28) or an axis 29a (FIGS. 11-12), which lever serves as a drive of the clamps 12R, 12L of FIG. 11 and 12). and assumes additionally the function of an energy accumulator. According to the embodiment of FIGS. 13 and 28, the rocking lever forms a drive connection between the guide means 5 and a movable mass. In all embodiments of FIGS. 1-13, the clamping means include a pair of clamps 9L, 9R, 12L, 12R, each consisting of a clamp 9L, 9R firmly attached to the slide 5 and an associated, movable clamp 12L, 12R. The movable masses 42, which act as energy storing means, are either stationarily arranged in the stroke end areas of the slide (FIGS. 1-10, 13, 28), or movably supported on the guide means constructed as a slide (FIGS. 11, 12).

In the case of FIGS. 1-3, 6-13, and 28, the movable mass is formed by a rocking lever 15, 15R, 15L, which is rotatably supported respectively about an axis 29 or 29a.

Figure 4:
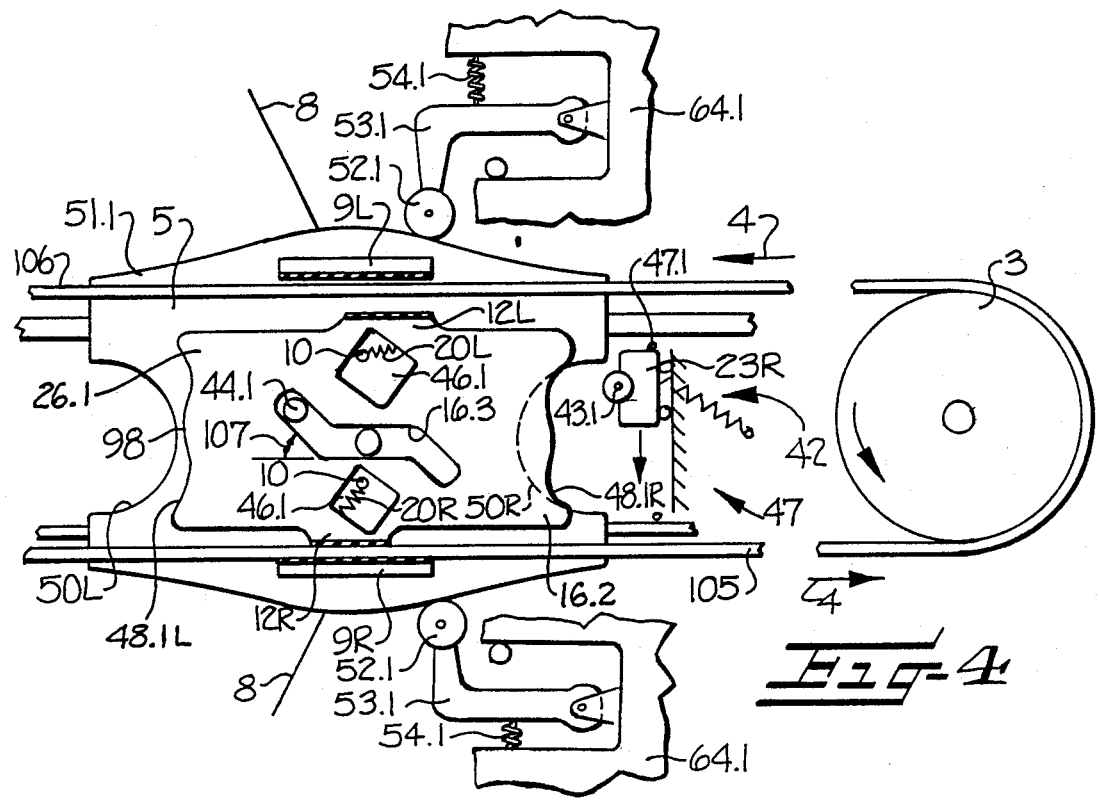
Figure 5:
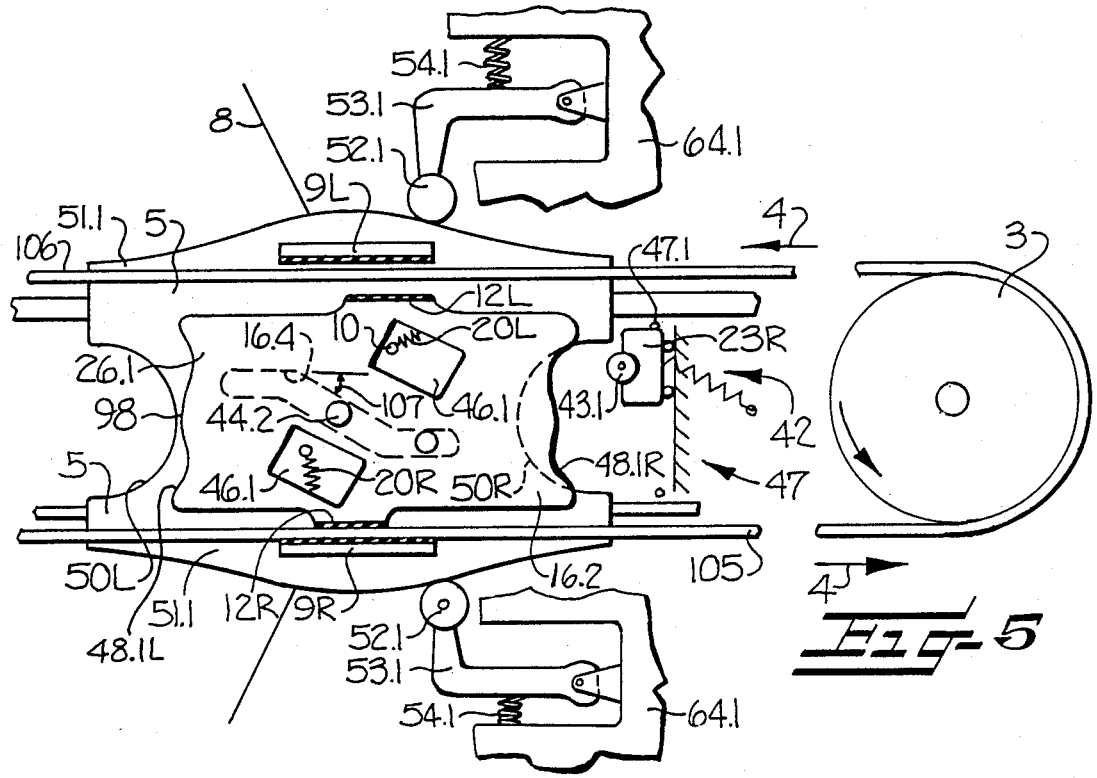

In the cases of FIGS. 4 and 5, the movable mass consists of a mass, which is guided linearly along a guideway 47 which is transverse to the traversing direction.

Referring now more particularly to the embodiment of FIG. 1, a yarn guide means 5a is provided, which is mounted for back and forth movement along a linear stroke path. The yarn guide means includes a slide 5, and a control disk 17 which is rotatably supported on a pivot pin 13, which is firmly connected with the slide 5. At its upper end, the control disk 17 includes a control arm 22. It is held in its momentary position against a stop 25R by a spring 16, which is tensioned between a perch 19 and a perch 21. The spring perch 19 is firmly connected with the slide 5 whereas the clamping perch 21 is firmly connected with the disk 17. Located in the lower portion of the control disk and integrally connected therewith is an eccentric disk 14, which forms two cams 35 and 35a and cooperates with bowed springs 11L, 11R. Each bowed spring is clamped with its one end in an associated support block 10L and 10R, respectively, and is curved oppositely to the eccentric disk 14. The other end of each bowed spring is attached respectively to a movable clamp 12L and 12R. Each movable clamp is operative respectively against a stop 24L and 24R firmly connected with the slide, when it is engaged with its associated run of the belt. As can be seen, the disk 17 is rotatable about the pin 13, it being held in its end positions against the stops 25R or 25L, respectively. The stops 25L, 25R are firmly connected with the slide. Additional, stationarily arranged stops 23R, 23L for the control arm 22 are each located in the areas of the motion reversal of the yarn guide slide. These stops cooperate with the control arm 22 of the disk 17, and their function will be described in more detail hereinbelow. Each movable clamp 12R or 12L is movably supported transversely to the drive belt and clamps the slide against its associated run of the belt. To this end an associated stationary clamps 9R or 9L respectively is located oppositely to each movable clamps on the other side of each belt run. As can be seen, each run of the belt can be clamped between the movable clamps and its associated, stationary clamp.

Located respectively on the right-hand end and the left-hand end of the traversing slide is a stop for the energy recovery means. Same consists of a push rod 26 with a guide head 27, which is formed by an enlarged portion on the end of the push rod. Located in the path of motion 32 of the guide head is an energy storing means n the area of the motion reversal. The energy storing means consists of a circular disk 28, which is supported on an axis 29a and rotatable about same between two positions. The two positions are defined by a pin 34, which engages in a groove 41 and serves as a stop. A pressure spring 18 is supported with its upper end on a stationary holder 40, whereas its other end is attached to the circular disk 28. In the two end positions of the circular disk, of which only one is shown, the spring 18 engages the circular disk in such a manner that it holds each time the circular disk in contact with the stop pin 34. Inbetween, it passes through a dead center position, in which it has its shortest length. This occurs, when the line of action of the spring passes across the axis of rotation 29a.

The head 27 serves as a stop for the mass, when the yarn guide means moves into the area of the motion reversal. The head 27 cooperates with the edge surface on the disk 28 which is formed by a recess 36 having a shape of a circular segment.

A drive means is provided for moving the yarn guide means 5a back and forth along its stroke path, which includes a belt 1 entrained about pulleys 2, and which moves in the direction 4. The slide 5 of the yarn guide means is released from the upper run of the belt 1 and reclamped to the lower run of the belt, as follows:

In the shown position the slide 5 moves to the right, since the upper run of the belt moving to the right is clamped between the movable clamp 12R and the stationary clamp 9R with respect to the slide. Both clamps are braced against each other via the bowed spring 11R and held in their position by the disk 17, which rests against stop 25R. When now the right-hand flank of the control arm 22 contacts stop 23R, the disk 17 is rotated to the left opposite to the traveling direction of the slide, thereby tensioning the spring 16. After the eccentric disk 14 with its cam 35a has passed the bowed spring, same is slackened and the slide is released from the belt. Then, the spring 16 passes across the axis of rotation of the pin 13 and pulls the disk 17 in the opposite direction. As it does so, the pair of clamps 12L and 9L is in a reversed manner engaged with the lower run of the belt, and during this time the slide is reversed and then entrained in opposite direction while being imparted a kinetic energy by means of the energy recovery means. During the reclamping procedure, the slide is temporarily disengaged from both runs of the belt and cooperates with the mass via the stop.

The following description of the operation will apply to all subsequent Figures. The stop which consists in the case of FIG. 1 of a push rod 26 and a guide head 27, approaches the movable mass and engages same upon its entry into the area of the motion reversal. The guide means will first attempt to maintain its state of motion and continue to move to the stroke end. As a result, the mass is forced to evade the movement of the guide means and is put from its illustrated position into an accelerated motion. Since the total energy of the guide means and the mass must be maintained, the speed of the guide means is slowed. While the guide means continues to accelerate the mass, the guide is slowed to a standstill. At this point, the yarn guide has reached the stroke end. The movable mass now attempts on its part to maintain its state of motion and engages the stop. As a result, the guide means is forced to evade in the direction of its possible movement. The force which is exerted by the mass on the stop, thus accelerates the guide means in the direction of its free mobility. The just-described procedure of the mutual exchange of energy, which occurs when the guide means is slowed down, is similarly repeated, the guide means now being accelerated and the mass slowed down at the same time.

Figure 2:
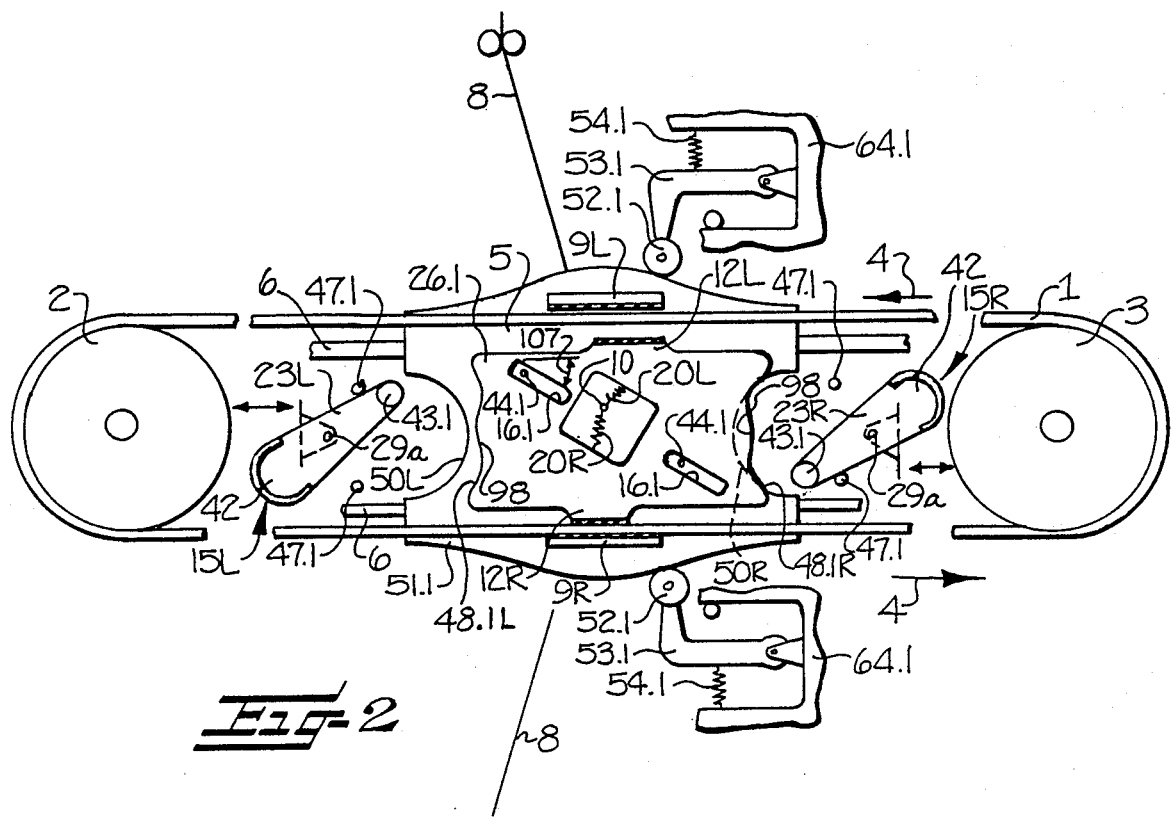

FIG. 2, which is a modification of FIG. 1, illustrates movable stops 23L and 23R, respectively, for actuating the clamping means 26.1 which are in the form of the rocking levers 15L, 5R. The rocking levers each accommodate a mass component 42 on one end, and they are rotatably supported about the axes 29a. On their free end they accommodate a slide block or follower 43.1 in the form of a pin or a roll. The stops 23L and 23R respectively are movable in the direction of the traverse stroke on supports which are schematically indicated. The supports may be of the type, such as is illustrated also in FIGS. 8 and 9, i.e., the stops may be located on guideways which are reciprocated by a threaded spindle, which is, as indicated there, drivable.

The movable clamps are part of a common gripper drive, which includes a movable gripper support 26.1, which assumes its clamping position assisted by the springs 20L and 20R. The gripper support 26.1 is a substantially rectangular plate, which has elongate slots 16.1. These elongate slots extend obliquely to the traveling direction of the slide, so that the extension of the elongate slots, which is directed away from the slide 5, forms with each arriving belt run an acute guide angle 107 smaller than 90°. Guide pins 44.1 engage in the elongate slots 16.1, which pins are firmly connected with the slide 5. Thus, the support 26.1 is movably guided in these guide pins 44.1, obliquely to the traversing direction, between two clamping positions.

Mounted on both flanks of the support 26.1, which extend parallel to the belt runs, are clamps 12L and 12R. In the clamping position of the support 26.1, one or the other of the clamp 12L and 12R contacts the respective belt and clamps same with the clamps 9L and 9R respectively, which are attached to the slide.

The two springs 20L and 20R are supported on an abutment 10, which is mounted on the slide. To this end, the support 26.1 is provided with an opening 46.1 in the area of the abutment 10. Two lateral flanks of this opening extend parallel to the elongate slots. The springs are centrally supported on these side flanks. The spring perch of the pressure spring 20L and 20R on the side flanks of the opening is so positioned that the springs are exactly aligned and extend perpendicularly to the connecting line of the elongate slots, when the support 26.1 is in the middle between its two end positions, i.e., its clamping positions. In the clamping positions, one of the belt runs is clamped respectively between the associated clamp 12R or 12L and the associated, stationary clamp 9R or 9L.

On its edges extending transversely to its traveling direction, the slide is provided with arcuate guide surfaces 50L and 50R, which are concave toward each stroke end. These guide surfaces cooperate in the stroke reversal areas with the stationary sliding follower 43.1 of the stops 23.1 and 23.R respectively, which are constructed as rocking levers and effect a braking or acceleration of the slide in the stroke reversal areas.

The one of the two guide surfaces 50 which faces respectively the entry stroke end (here 50R), is partially covered by the lateral edge of the support 26.1, which is constructed as a plate, whereas on the opposite end of the slide 5, the lateral edge of the support 26.1 is covered by the guide surface 50L. In the illustrated embodiment, the lateral edge 48.1L or respectively 48.1R of the support 26.1 is arcuately curved and concave with regard to the respective stroke end. However, in the area of the longitudinal center line of the support 26.1, this curve is additionally provided with a bulge 98.

In the illustrated clamping position, the slide 5 is carried along in the direction 4 by the lower belt run which is clamped between the clamp 12R and the clamp 9R, and it is moved to the right-hand stroke reversal area. The stationary rocking lever 23R rests against the lower stop 47.1. The guide surface 50R is so shaped that it moves with its end substantially tangentially onto the follower 43.1 of the rocking lever 23R. As a result the rocking lever 23R is pivoted clockwise, and the follower 43.1 moves along the guide surface 50R. In so doing, the follower 43.1 also contacts the lateral edge 48.1R of the support 26.1, thereby displacing the support 26.1, relative to the slide 5, against its traveling direction on the guide pins 44.1 in the elongate slots 16.1, obliquely to the direction of the belt. As a result, the clamp 12R is disengaged from the belt. Meanwhile, the slide is slowed down, and its kinetic energy is transmitted for the acceleration of the movable mass. As a result of the arcuate construction of the edge 48.1R it is accomplished that the support 26.1 moves free of shocks. The bulge 98 which is additionally provided at the bottom of the curved edge 48.1R imparts to the support an additional acceleration shortly before it reaches the middle between its two end positions, when the rocking lever contacts the bulge with the motion of the mass and pushes same out of its path.

The force of the springs 20R, 20L is overcome, and the springs are caused to pass beyond their dead center position. Now, the support 26.1 moves, relative to the slide 5, under the reversed direction of the spring force, automatically to the other clamping position, in which the clamp 12L and the clamp 9L engage the belt. Since the upper belt moves in a direction away from the illustrated stroke end, and since the direction of the belt forms an acute angle with the guidance of the support 26.1 in the elongate slots 16.1, the belt also exerts a force on the support in its direction of movement relative to the slide, and forces the support into its clamping position. Consequently, the clamping forces need not be applied by the springs 20R and 20L, which rather serve the purpose of moving the support 26.1 into its clamping position and ensuring a clearly clamped position.

In addition, the traversing system shown in FIG. 2 is provided with a drive means which can also be applied to the subsequent traversing system. To this extent, the description and the drawing will also apply to the following embodiments.

The slide 5 is provided on each of its opposite longitudinal sides with an acceleration rail 51.1, which extends substantially parallel to the belt runs. Facing the respective stroke end, each acceleration rail has, relative to the traversing direction, a leading flank and a trailing flank on the other side. Each acceleration rail cooperates with a roll 52.1, which is movable along a fixed path transversely to the traversing direction. This roll is supported on an angled rocking lever 53.1, which extends substantially parallel to the traversing direction and is supported by a spring 54.1 transverse to the traversing direction. The two holders 64.1 for the rocking levers 53.1 are, if desired, movable together with the rocking levers 23L and 23R, which operate as stationary stops, and thus participate in the displacement of the stroke end for the change of the traverse stroke.

Operation of the startup auxiliary is as follows. Upon the entry of the slide 5 into a stroke reversal area, the roll 52.1 contacts the leading flank of the acceleration rail 51.1 and moves upwardly along the same. As a result, the pressure spring 54.1 which is operative on the roll 52.1, is compressed, since the cooperating pair of clamps 9R, 12R, or 9L and 12L, continues to clamp the belt. The energy stored in the spring 54.1 is converted to an acceleration of the slide 5 in direction of the stroke end, since the phase of movement the pertinent pair of clamps 9L, 12L, or 9R, 12R, is no longer engaged. Consequently, a large force can be imparted to the slide 5, so that the support 26.1 is moved with an adequate certainty beyond its dead center position and reversed. This type of reversing auxiliary is particularly advantageous in connection with an embodiment of FIG. 2, in which the clamping force of the clamp pairings is not only exerted by spring force, but is self-increased by a self-locking effect.

Figure 3:
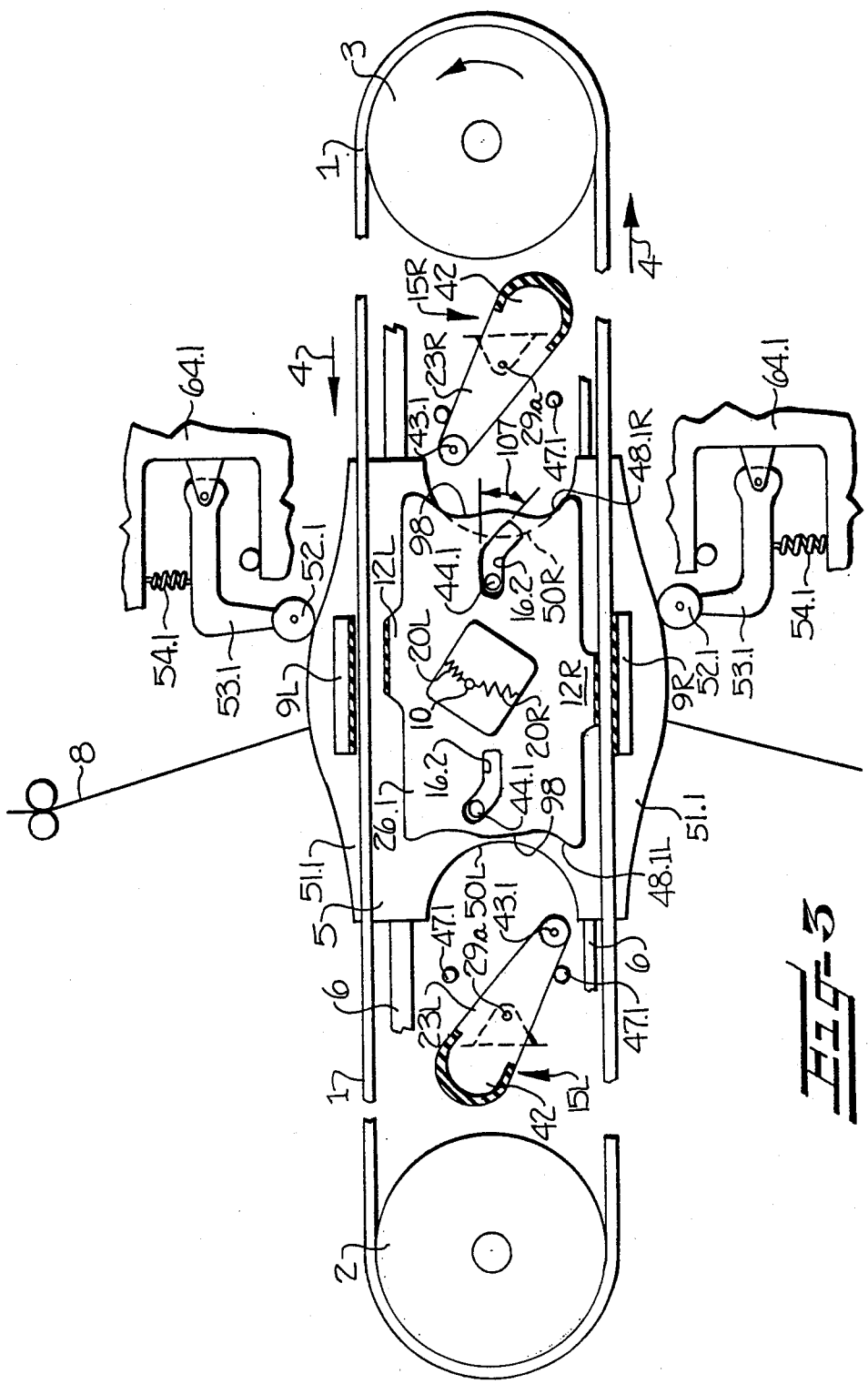

The traversing system shown in FIG. 3 is comparable to the traversing system shown in FIG. 2. The substantial difference is in the guiding means of the support 26.1. This guiding means consists of two angled slots 16.2, which are arranged approximately in the central longitudinal area of the plate, and of which one each faces a stroke end. A guide pin 44.1, which is attached to the yarn guide slide, engages in each slot. In the illustrated clamping position, each guide pin is located in the left-hand portion of the pertinent angled slot, whereby in the illustrated position, the plate is guided in such a manner that a self-increasing clamping effect of the engaged clamps 12R, 9R is produced.

The end portions of the angular slots, which face each other are located on a common line, which extends in the longitudinal center of the support parallel to the traversing direction. The angle portions of each slot are inclined toward the respectively operative belt run, which is located between the respectively operative clamping point and the pertinent entry stroke end. The angled slot portions extend likewise parallel to each other. In other words, the respective angles of guidance 107 for the movement of the yarn guide slide to the right or to the left are identical.

The operation of the illustrated system or support is as follows. Upon the entry of the yarn guide slide into the stroke end—in the present case into the right-hand stroke end—the follower 43.1 arrives at the upper area of the guide surface 50R, which is produced by a semicircular recess. At the point, where the follower first contacts the guide surface, the follower 26.1 is simultaneously actuated via the guide edge 48.1R so that the same is displaced against the direction of movement 4 of the yarn guide slide, with the guide pins 44.1 cooperating with the angular slots as follows: The end of the support facing the righthand stroke end is guided, parallel to the traversing direction, in the slot portion of the right-hand angled slot which extends parallel to the traversing direction, whereas the left-hand portion of the gripper holder is guided in the slotted portion, which is inclined toward the upper belt run. Thus, the right-hand angled slot effects a guidance parallel to the traversing direction, whereas the left-hand angled slot raises the gripper holder to such an extent that the engaged clamps 12R, 9R are disengaged. The yarn guide slide now floats freely and releases its kinetic energy to the mass 42. It continues to move in the same direction, until it reaches the right-hand stroke end. At the same time, the two springs 20R, 20L are tensioned. After the left-hand guide pin 44.1 has reached the angular portion of the left-hand angular slot 16.2, which extends parallel to the traversing direction, the right-hand guide pin is in the downwardly angled portion of the right-hand angled slot. In other words, the left-hand portion of the support 26.1 is now guided parallel between the belt runs, while the right-hand portion can move in direction of the upper belt run. After the springs 20R, 20L have passed beyond their dead center, this movement of the support is produced by the springs. Once the upper clamps 9L, 12L engage the upper belt run, the yarn guide slide is moved to the left, and the procedure repeats itself similarly in the left-hand stroke end. As to the cooperation of the other parts shown in FIG. 3, reference is made to the foregoing description.

FIGS. 4 and 5 show a fragmentary view of a belt traversing system, in which the schematically represented masses, consist each of a carriage, which is movable transversely to the direction of the belt run. Each carriage is displaceably guided, between the stops 47.1 arranged on both sides, along the straight, longitudinal guideway 47, between two end positions. A stationarily supported pressure spring holds the carriage in each end position against one of the stops 47.1. Attached on the side of the carriage which faces the yarn guide slide 5, is a follower 43.1, which cooperates, as described in connection with the FIGS. 2 and 3, with the guide surface 50R as well as the guide edge 48.1R. Each support has two window-like recesses 46.1, which are arranged on both sides of the center line of the support extending in the traversing direction. Each window accommodates a spring 20L, 20R, the other end of which is supported on the abutment 10. Each post 10 is mounted on the yarn guide slide 5.

Moreover, FIG. 4 shows a transversely extending, S-shaped slot 16.3, which is constructed as a recess in the support 26.1. The slot extends in the hand portion of the slot is inclined toward the forward belt run 105. The angle of inclination which is measured toward the horizontal, corresponds to the indicated guide angle 107. Two guide pieces 44.1 engage in the slot, which are firmly connected with the yarn guide slide 5. The diameter of the guide pieces, which are constructed as round pins, is so selected that the support is imparted a good guidance and yet can be moved easily.

In contast thereto, FIG. 5 illustrates a Zshaped slot 16.4, which is provided in the yarn guide slide 5 and symmetrically arranged between the guide tracks 50R and 50L. The portions of the slot facing the respective stroke ends extend, laterally displaced from each other, parallel between the belt runs and are interconnected by a central portion, which is inclined toward the traversing direction at the guide angle 107. In the illustrated view, the z-slot is located behind the support 26.1, to which the guide pieces 44.2 are firmly attached.

The operation of the gripper holders of FIGS. 4 and 5 corresponds to the foregoing description. Important, however, is that only the end of the support, which faces the entry stroke end, is guided substantially parallel, whereas the other end can perform a guided movement, obliquely to the belt runs, to achieve a self-increasing clamping effect.

FIG. 6 shows a modified guide means for the clamp support 26.1, and a bracket 64.1, which is adjustable in the direction of the traverse stroke. The support post 10 is firmly connected with the yarn guide slide 5. The support 26.1 is constructed in point symmetry with regard to the center of the window 46.1 A guide edge 30L, 30R extends obliquely to each belt run on the outside of the support, and the edges 30L, 30R are straight and parallel to each other. Also, each guide edge is inclined at the guide angle 107, toward the respectively clamped belt run. Two shoulders 37.1 are located, diagonally opposed, on the slide 5, and each shoulder includes a straight-line guide edge 32L, 32R which rests against the guide edges 30L, 30R of the support. As can be seen, the guide edges 30.L, 30.R on the support 26.1, or 32L, 32R on the slide 5, form respectively a surface pairing 38.1, along which the support 26.1 can be precisely moved. The support can be moved along this guideway respectively in a straight line and assumes either the end position drawn in solid lines, or the end position indicated in dashed lines. In each end position, one of the two belt runs is respectively connected with the yarn guide slide in a self-increasing frictional engagement, whereas the other belt end can pass through freely.

In the right-hand portion of the traversing system, the bracket 64.1 is displaceably guided between two straight guideways 26T, 26U. Mounted on the bracket are the movable mass 42, the stop 23R, which cooperates with the clamping means and the equipment of the auxiliary drive, and which is firmly mounted on the left-hand end of the bracket, which faces the yarn guide. A holder 53.1 for the auxiliary drive is rotatably supported for rotation about the axis 29.1.

The holder 53.1 accommodates a lever 22.1, the one free end of which carries a sliding piece 52.1 constructed as a roll and rotatable about the axis 52.L. The other end of the lever is attached to the holder 53.1. The lever can be rotated about the axis 52.R. Arranged between the holder 53.1 and the lever 22.1 is a pressure spring 54.1, which pushes the lever toward the outside periphery of the upper belt run. A stop 39.1 limits the pivotal motion of the lever toward the outside periphery of the belt. A motor 111 is mounted on the bracket 64.1 and drives an adjusting worm 113 in its two possible adjusting directions 116. The other end of the motor shaft is supported in bearing 115. The adjusting worm engages a gear tooth system, which is provided on the outside periphery of the holder 53.1. By the rotation of the adjusting worm in one of the two possible directions 116, the holder 53.1 is pivoted in one of the two directions 108, thereby either moving the contact roll 52.1 toward the upper belt run and pressing same thereagainst under the increasing spring force or removing the roll from the belt. When the pressure roll 52.1 is in contact with the upper belt run, it rolls along same, free of wear and tear, in the rotary direction 109. The elastic mounting support of the pressure roll about the axis 52R, which is provided by the pressure spring 54.1, allows the roll to resiliently move on the upper belt run.

A motor 110 drives a threaded spindle 112, which can be rotated in two directions 117. Furthermore, the threaded spindle is constantly engaged with the bracket 64.1 by means of a thread extending therethrough.

The yarn guide slide 5 has a longitudinal recess 35R, which faces the stationary stop 23R and is so wide that the slide can contactlessly move into the stop. The longitudinal recess extends into the slide 5 so deep that even at the stroke reversal point the stop 23R does not contact the slide. The longitudinal recess is partially covered by the overlying support 26.1.

A similar longitudinal recess 35L is located on the diagonally opposite side at the bottom, which is not covered in the illustrated clamping position of the gripper drive. Furthermore, the support 26.1 is provided with diagonally opposite, arcuate guide edges 48.1L, 48.1R, which are each a driving edge for the support 26.1, in that the support moves with its driving edge along the stationary stop 23.R and is, thus, displaced along its guideway. The arcuate portion of the guide edge is so aligned that same moves with its one end which faces the stroke end, tangentially onto the stationary stop 23R. Between its end the arcuate portion is continuously curved and forms an angle somewhat smaller than 90°. The curvature extends in such a direction that the other end is so aligned that the arcuate portion is open against that component of the direction of movement of the support, which leads, at the momentary clamping position, to the release of the clamping connection, in that the respective end is directed toward the outside. Additionally provided on the yarn guide slide 5 are stationary clamps 34R and 34L. As can be seen, the stationary clamp 34L is spaced from the lower belt run, i.e., it does not contact the passing belt. As can also be seen, the upper belt run frictionally engages, from the outside, the upper stationary clamp 34R, since the clamping roll 52.1 presses the belt firmly against the stationary clamp by means of the compressed spring 54.1. Located on both face ends of the yarn guide slide, which face the respective stroke end, is respectively the guide head 27 of the push rod 26. As can be seen, upon the entry of the slide into the illustrated stroke end, the head cooperates with the schematically illustrated, movable mass 42. Same is rotatably supported on a lever 66, which can be adjusted in the traversing direction by means of the threaded spindle 68. A motor 119 serves to drive the threaded spindle in the two possible directions of rotation 69a. The threaded spindle is constantly engaged with the lever 66 by means of a thread extending therethrough. The lever 66 is guided straight between two schematically illustrated guideways, in the traversing direction and parallel to the belt runs.

The same structural parts are symmetrically available in the opposite stroke end of the traversing system, which is not shown.

The operation of the belt traversing system illustrated in FIG. 6 is as follows: In the illustrated clamping position, the upper belt run is clamped, in frictional engagement, between the clamps 9R and 12R. The guide edges 30R, 32R press clamps 12R on support 26.1, in a self-locking frictional engagement, against the stationary clamp 9.R. This means that the clamping effect between the two clamps increases itself due to the tension of the belt. The pressure which is necessary to produce the frictional force, is applied by the surface pairing 38.1. With the aid of adjusting motor 111, the holder 53.1 is pivoted in the direction toward the upper belt to such an extent that the roll 52.1 is raised from its stop 39.1 which is moved along, and is now held in contact with the outside periphery of the belt by the tensioned pressure spring 54.1. The roll is driven in the direction 109 by means of the outside periphery of the upper belt run. As a result of the spring force, the upper belt run is pushed in direction of the additional, stationary clamp 34.R to such an extent that the inner side of the belt run becomes frictionally engaged with the clamp. The holder 53.1 has meanwhile pivoted so far in the direction toward the upper belt run that the spring force is great enough to accomplish a reliable reclamping of the yarn guide slide, as will be explained in more detail hereinbelow.

The exit end of the arcuate guide edge 48.1, which faces the illustrated right-hand stroke end, is so aligned that the guide edge moves first tangentially onto the stationary stop 23R. For this reason, no impact shock will occur even when the guide edge 48.1 meets the stop 23R at very high double stroke rates. As a result of the support 26.1 being arranged with its guide edges 30L, 30R, free of play, between the guide edges 32L, 32R, the supporting guide surface will transmit all guide forces to the support in a precise manner and free of shocks, as the reversing procedure starts, i.e., as soon as the support is set in motion. The surface pressure distributes itself uniformly over the entire surface, whereby wear and tear is avoided. While the yarn guide slide 5 is pulled by the still clamped belt run further in direction of the right-hand stroke end, the stop moves along the guide edge 48.1, thereby forcing the support to withdraw from the traveling direction of the yarn guide slide along the guideways 30L and 32L respectively. It can be seen that the forced movement has a first component in the traversing direction of the yarn guide slide, whereas a second component extends perpendicularly to the traveling direction of the yarn guide slide. The component which extends perpendicularly to the traveling direction of the yarn guide slide, causes the clamps 12R and 9R to disengage, thereby releasing the clamping effect between these two clamps.

If the speed of the yarn guide slide is adequately high in the normal traversing operation, and naturally, also at high double stroke rates, the yarn guide slide will continue its movement, while the support is held back by the stop, and thus moved against the movement of the yarn guide slide and against the spring forces, which are operative on the support. As a result thereof, the springs 20L and 20R are first tensioned. Between the two end positions of the support, however, the two springs overtravel their dead center, and after they have passed beyond their dead center, they are then again relaxed. Consequently, after the springs have over-traveled their dead center, the support is moved, assisted by the spring force, up to its other clamping position, or, however, at least so far that it can reliably engage the other belt run for the drive in the opposite direction, so that the pair of clamps can then contact the belt self-increasingly in frictional engagement.

When the window 46.1 in the support is symmetrically arranged, the two springs 20L and 20R are located on a common line of action at the moment they overtravel their dead center, and have then their shortest length. Thus, it is essential at a reversal, that the clamp locking drive is displaced along its guideway so far that the two springs overtravel their dead center with certainty. As a result of the arcuate construction of the guide edge with the upwardly directed opening, the support 26.1 is overproportionately displaced along its guideway on the slide with respect to the distance, which is covered by the slide in the stroke reversal area. The support 26.1 is thus additionally accelerated and moved beyond its center position. The additional acceleration causes the support to move at a greater speed in direction of the other stroke end than the slide, which is reversed while maintaining its kinetic energy. Consequently, the stationary clamp on the support is able to engage the belt run moving in the opposite direction, as soon as it reaches approximately the belt speed due to the additional acceleration. As a result of the starting, self-increasing clamping effect, the oppositely moving belt run is then reliably clamped, and the procedure repeats itself analogously in the opposite stroke end. Thus, at high traversing speeds or double stroke rates, the arcuate guide edge can prevent the yarn guide slide, which reverses while maintaining its kinetic energy, from passing the support which is guided with one component along the traversing direction.

It may occur, in particular when the traversing system is started up, i.e., when the yarn guide slide enters into a stroke end and while the belt has not yet reached its final speed, that an engaged clamping connection is released, but that the speed of the slide is not yet adequate to move the support beyond the dead center position of the springs. In order to accomplish this, the auxiliary drive is provided, which engages the upper belt run from the outside. To this end, the holder 53.1 is pivoted by means of the driven adjusting worm 113 in a direction toward the belt run. In a certain pivoted position, the pressure roll 52.1 just contacts the upper belt run. As the holder 53.1 continues to pivot, the one-arm lever 22.1 is raised from the stop 39.1, and the pressure spring 54.1 is compressed between the lever and the holder 53.1. The contact force of the roll and the oppositely directed force of the spring 54.1 now become operative on the lever 22.1. This means that, by a further rotation of the holder 53.1, on the one hand, the spring is compressed, thereby increasing the spring force. On the other hand, the contact pressure, which is exerted by the roll 52.1 and operative on the belt, is simultaneously increased according to the law of leverage. At a certain contact pressure on the belt, same is pressed so much against the surface of the stationary clamp 34R that the slide moves, even at a lesser speed and despite the disengaged clamps 12R, 9R, by the resultant frictional force of the auxiliary drive, so far in the direction of the stroke end that the support 26.1 is displaced beyond the dead center of the springs. After the support has reversed, the self-increasing clamping effect of the clamps 12L, 9L sets in, and the slide 5 removes itself from this stroke end area in opposite direction. As a result of the self-increased clamping force the slide is pulled by the lower belt run out of the illustrated stroke end against the frictional force, which is exerted by the auxiliary drive on the slide. After the belt has reached the required final speed, the auxiliary drive is removed by means of drive motor 111 from the operating area of the belt run, since it is no longer needed.

To effect an adjustment of the traversing stroke, the threaded spindle 112 is driven by the pertinent motor 110 in one of the two rotational directions 117. The spindle meshes with a thread 118 extending through the bracket 64.1. By the rotation of the threaded spindle in the one or the other direction, the bracket 64.1 can be moved parallel to the belt runs. At the same time, both the stationary stop 23R and the movable mass 42 and the auxiliary drive mounted on the upper portion of the support are moved along by the same distance. Then, the position of the stop 23R defines the new position of the stroke reversal point of the traversing system.

As to the interaction of the yarn guide and the movable mass, which is arranged in the stroke end, reference is made to the foregoing Figures and the pertinent descriptions. However, in the illustrated traversing system a difference results in that the axial position of the mass, i.e., the position in the traversing system, is adjustable by means of a support 66.1 on the mounting bracket 64.1. As a result of this separate adjustability it is ensured that the time sequence, especially the start and the end of the reversal of slide 5, can be adjusted irrespective of the reversing motion of the support 26.1 and that yet the traverse stroke can be easily adjusted.

FIG. 7 illustrates the slide 5, which moves along a straight guideway, and accommodates a yarn guide 7 in its lower portion. The yarn guide 7 guides a yarn 8 perpendicularly to the plane of the illustration. Arranged between the yarn guide slide 5 and the yarn guide is a guide track 50a, which cooperates with the mass 42 in the area of the illustrated stroke end. The rear, illustrated belt run moves to the right in direction 4R. The yarn guide slide is clamped to this belt run and moves likewise in the direction 4R. The oppositely moved belt is left off for reasons of a better illustration. The gripper support 26.1 is movable in the direction 124. It is displaced along the upper plane 120, when the yarn guide slide is moved to the stationary stop 23R. During the displacement of the gripper support, a force is exerted by the stop 23R on the gripper support, the moment of which force has a distance 123 with respect to the center of gravity 122 of the slide. As a result of the cooperation between the mass 42 and the guide track 50a a braking or an accelerating force is exerted on the yarn guide slide, which is in the lower plane 121. Also the moment of this force has the distance 123 with respect to the center of gravity. In the present embodiment it is assumed, for simplicity sake, that the forces operative in the upper plane 120 and in the lower plane 121 are each identical. Consequently, it results that the respective distances of the planes of force application from the center of gravity must also be identical, so that no additional twisting moment becomes operative on the yarn guide about an axis extending transversely to the traversing direction. Also in this embodiment a corresponding auxiliary drive may be provided, as to which reference is made to the foregoing description. It is also possible to provide that both the stationary stops 23L, 23R and the mass supported on the axis of rotation 29a are adjustable in the illustrated stroke end areas, each parallel to the traversing system.

FIG. 8 is an operational diagram of a belt traversing system with a contactless auxiliary drive, in which the traverse stroke can be adjusted by means of two threaded spindles arranged in the stroke ends. Each auxiliary drive comprises a horseshoe magnet 97, which is mounted on a support 66.1. The support 66.1 is adjustable in the axial direction 95 by means of the threaded spindle 68.1. To this end, the threaded spindle 68.1 possesses an adjusting wheel 69. The threaded spindle is supported in bearings 70, fixedly in both the axial and the radial direction, but rotatably in the direction 69a. At their ends, the stroke adjusting spindles 68 are likewise provided with a wheel 69, and they are likewise rotatable in both adjusting directions 69a. Each stroke adjusting spindle extends through the support 66, on which the mass 42, constructed as a rocking lever, is rotatably supported. To this end, the supports 66 are provided with a thread, which assists in axially adjusting the support in the direction 94 within the holder 40 in the same or opposite direction. Further provided at each end of the slide 5 of the yarn guide 7 is a ferromagnetic material 102 in the shape of a semicircular ring, each facing the stroke end. This material cooperates contactlessly with each of the horse-shoe magnets arranged in the stroke ends. The magnets 97 serve as a contactless auxiliary drive. They can be moved out of the way simultaneously with the support 66.1 by rotating the threaded spindles 68.1 in the direction of movement 101. The axial adjustability of the support of the magnet serves to adapt the position of the magnets 97, which operate as an auxiliary drive, to the respectively adjusted traverse stroke. In the place of the magnetic auxiliary drive, also a mechanical auxiliary drive may be used, such as, for example, as shown in FIG. 2, or an electromagnetic drive. However, each auxiliary drive in the stroke end areas should be adjusted simuntaneously with, or in the same direction as, the adjustment of the traverse stroke. Likewise, the adjustment of the traverse stroke, as illustrated, may also be applied to the other embodiments.

FIG. 9 also shows a traversing system, in which the traverse stroke can be adjusted by means of threaded spindles, which are arranged in the stroke ends. An essential difference from the traversing system of FIG. 8 is that the horseshoe magnets 97, which serve as an auxiliary drive, are firmly connected with supports for the masses at 66.2. This has the advantage that the position of the auxiliary drive is simultaneously adjusted with the adjustment of the traverse stroke.

The operation of the auxiliary drive is as follows. The yarn guide slide moves respectively at the speed of the belt toward the corresponding stroke end. As it enters into the stroke end area, it moves into the operative area of the horseshoe magnet 97 and is subjected to an attraction equidirectional to its direction of movement. After the stop 23R has actuated the gripper support, the pertinent clamps 21R, 9R disengage and the slide floats freely. As a result of the attracting magnetic force, which is operative on it, the mass 42 is more accelerated than in the absence of an auxiliary drive. Consequently, the mass also stores the driving energy of the auxiliary drive, i.e., the maximum speed of the mass 42 set into motion is correspondingly higher. The higher kinetic energy, which is received by the mass, is now returned to the yarn guide after the stroke end is overtraveled, whereby same is accelerated, against the magnetic force of attraction, out of the stroke end. As aforesaid, the gripper support reverses the movable pair of clamps. After the movable clamps have engaged the returning belt run, the pair of clamps are held in position, and the slide is moved toward the opposite stroke end, etc.

As is illustrated in FIG. 10, the slide 5 accommodates an axis of rotation 128, about which a gripper lever 129 is rotatably supported between its two end positions. The end positions of the lever 129 are defined by the arrangement of each of the stationary clamps 9R and 9L. A tension spring 16 is firmly connected with the yarn guide slide, on the one hand, and with the lever 129, on the other. Its line of action, i.e., the connecting line between its end points, extends in the illustrated position of the lever on the right side of the axis of rotation 128. In the other end position of the lever, which is not shown, the line of action of the spring 16 extends on the left side of the axis of rotation. In the other clamping position, the pair of clamps 12R and 9R engages the upper belt run, whereas the lower belt run can pass freely. Also mounted on the gripper lever 129 are the stops 23L and 23R, each facing a stroke end. The stop 23L forms with the illustrated drive edge 33.1 a stop pairing. The stop 23L cooperates with the drive edge 33.1, when the yarn guide slide 5 is moved far enough into the left-hand stroke end. The drive edge 33.1 is stationarily arranged.

The operation of the illustrated traversing system has been explained already in the foregoing description. A difference lies in the reclamping mechanism of the movable clamps 12L and 12R which are drivingly rigidly interconnected.

As can be noted, in the left-hand stroke end area, the stop 23L enters into the open end of the drive edge 33.1. As the slide 5 continues to move, the stop which is constructed as a sliding piece, follows the curved track of the drive edge, thereby rotating the lever 129 anticlockwise. As a result, the spring 16 is first tensioned. In addition, the slide is slowed down by the acceleration of the mass 42. The resultant of the inertia forces, which is operative on the lever 129, engages on the center of gravity 127 in the direction to the left, and consequently possesses a component, which lies in the momentary direction of rotation, thereby also assisting the pivotal movement of the gripper lever, which is forced by the drive edge. In the stroke end, the line of action of the spring 16 passes across the axis of rotation 128. Subsequently, the mass 42 becomes operative on the yarn guide slide 5 and accelerates same in the other direction. The resultant of the inertia forces operative on the gripper lever, which engages in the center of gravity, further effects the pivotal movement of the lever in the same direction, and the spring 16 passes with its line of action across the axis 128, while the yarn guide slide is simultaneously accelerated in the direction of the right-hand stroke end. After the movable clamp 12L has engaged the belt, the self-increasing clamping effect starts, and the slide 5 is carried along to the right side. The procedure repeats itself analogously in the right-hand stroke end, etc.

The illustration in FIG. 11 largely corresponds to that of FIG. 10. An essential difference results in that the gripper lever 129 now assumes in addition the function of an energy accumulator; and, therefore, is as a rocking lever supported for rotation about the axis 29a. Other than in FIG. 10, the drive edge 33.1 is now arcuate and concavely open toward the stop 23L, and forms in addition the guide track 50 for the sliding block 37. The guide track is adjustable along the direction 94. As to the operation of the gripper drive and the movable mass, reference is made to the foregoing descriptions.

FIG. 12 illustrates a yarn guide slide 5, which is reciprocated along a straight guideway 6 by respectively one of the belt runs 1. The upper belt run moves to the right in direction 4R, and the lower belt run to the left in direction 4L. Mounted on the rear side of the yarn guide slide 5 is the yarn guide 7 which deflects the yarn 8. Stationarily arranged on the slide are the clamps 9R and 9L. Also located on the slide is the axis of rotation 29a, about which the rocking arm 15 is rotatably supported. The axis of rotation extends normal to the traveling direction of the slide which is defined by the straight guideway 6. Firmly attached to the rocking arm are the two movable clamps 12R and 12L. In the illustrated position, the lower belt run is clamped between the pertinent pair of clamps 12L and 9L. In the other pivoted position of the arm 15, which is not shown, the upper belt run would be clamped between the pertinent clamps 12R and 9.R, and the lower belt would be able to pass freely. Furthermore, the rocking arm accommodates sliding blocks 37, which are diametrally opposed with respect to its axis of rotation. In the illustrated left-hand stroke end area of the slide 5, an arcuate guide track 50 is stationarily arranged in the stop 23, the guide track being symmetrical, with regard to a line parallel to the straight guideway, through the reversal point 50.I. The reversal point is the end of the path for the left-hand sliding piece 37. The pressure spring 18 is supported with its one end on the rocking arm, whereas its other end is firmly connected with the slide 5.

The operation of the illustrated traversing system is as follows. At the moment, the slide moves in the direction 4L to the left. The lower belt run is clamped between the clamps 12L and 9L. The line of action of the pressure spring 18 extends above the axis of rotation 29a, and it holds the rocking arm in the illustrated idle position, with the engaged pair of clamps having the function of a stop against the spring force. The lower sliding block 37 then moves onto the guide track 50. The guide track and the sliding block contact each other at the starting point 56A. The starting point 56A or the end point 56E are each the extreme point of contact of respectively the lower or upper line of contact with the guide track. There, the tangent to the guide track extends parallel to respectively the lower or upper line of contact. As a result of the clamping engagement, the slide is pulled by the lower belt run to the left.

However, the guide track forces the sliding block into an arcuate reversing path, thereby rotating the rocking arm about the axis 29a. As a result of the rotation, the connection between the clamps 12L and 9L disengages. The slide floats freely, and attempts to move on in a straight line while maintaining its kinetic energy. The guide track, however, forces the rocking arm on a preset path. The therefrom resulting force is transmitted, via the axis of rotation 29a arranged on the slide, to the slide against its direction of movement. As a result the slide is slowed down, and in addition, its kinetic energy is transmitted as rotational energy to the rocking arm. When the sliding block contacts the guide track at the reversal point 50I, the slide has reached zero speed, and the rotational speed of the rocking arm is maximum.

The kinetic energy of the parts which are moved jointly with the slide, is thus converted to the rotational energy of the rocking arm. At this time, the line of action of the spring 18 moves across the axis of rotation 29a. It has now its shortest length and passes through the position of its maximum spring force. None of the two pairs of clamps 9, 12 are engaged. The rocking arm itself now attempts to maintain its rotational energy and continues to rotate in the unchanged direction 25. In so doing, the sliding block rests against the guide track, thereby accelerating again the slide, via the axis of rotation 29a, to the right. The sliding block continues to move along that portion of the guide track, which extends between the reversal point 50I and the end point 56E, thereby further accelerating the slide to the right, until the sliding piece leaves the guide track at end point 56E. The rocking lever has now reached zero speed, and the slide its previous speed, the direction of which, however, is reversed. The line of action of the spring 18 extends now below the axis of rotation 29a. As soon as the movable clamp 12R contacts the upper belt run, the self-increasing clamping effect starts, and the belt run is engaged for a reliable drive. Now, the pair of clamps 9R, 12R has again the function of a stop against the spring force. This procedure repeats itself analogously in the opposite stroke end of the slide, with the difference that now the other sliding block moves into the corresponding guide track of the right-hand stroke end.

FIG. 13 illustrates a further embodiment of the yarn guide slide 5 of the present invention. The slide mounts the yarn guide 7 and is moved along the two parallel straight guideways 6. The belt 1 serves as the drive, with the illustration showing its upper and lower belt runs. To clamp the yarn guide slide against each of the belt runs, the stationary clamps 9L or 9R and the clamp 12 movable thereto are used, the latter being able to move in the area between the two belt runs, as will be explained below. In the illustrated position, the upper belt run 1 is held between the clamps 9R and 12. Consequently, the slide moves in direction 4R to the right toward the illustrated stroke end. Supplementing the foregoing description, the slide accommodates a lever 132, which is rotatable about the axis 128, so that it assumes one end position, when the clamp 12 contacts one of the two belt runs. In each end position, it is held in the clamped position by the spring 18. To this end, one end of the spring is attached to the lever 132, and the other end is firmly connected with the yarn guide slide. In the end positions of the lever, the line of action of the spring does not extend through the axis 128, but is below the axis of rotation in the one end position and above the axis of rotation in the other end position. On each of its ends the lever 132 accommodates a sliding block 37 and a stop 23R or 23L, respectively.

By means of the apparatus shown in the right-hand portion of FIG. 13, the yarn guide slide is reversed in the stroke end, while maintaining its kinetic energy. Simultaneously, the movable clamps are disengaged and reclamped. To this end, the concave control cam 33.1 is stationarily arranged. The open ends of the control cam are each directed tangentially in direction of the yarn guide slide. Rotatably supported on the axis 29 is the movable mass, which consists of a circular disk which is symmetrical to the axis of rotation 29 and into which six wedge gaps 31 are recessed.

Each wedge gap is outwardly open in the radial direction and terminates on the largest diameter of the circular disk. A guide track 50 is formed between the two ends of each wedge gap. The recesses form a regular star with six arms, which are arranged to each other in rotational symmetry at equal angular distances 49. Concentric to the axis of rotation 29 is an indexing disk 130, which is firmly connected with the mass 42. The indexing disk has six recesses, which are arranged at the same angular distances as the six arms of the star. As can be seen, an indexing control 131 is pivotally supported at a location between its two ends. One end is located in a recess of the indexing disk, whereas the other end is under the compressive action of a spring. As a result the opposite end thereto is pushed into the recess according to the law of leverage.

The supplemental FIG. 13A illustrates the reversal and the reversing apparatus as viewed from the yarn guide slide. The indexing disk is omitted for a better illustration. The lever 132 accommodates, coaxially arranged, the sliding block 37 and the stop 23R. In its illustrated position, the control cam is passed through from the left to the right, whereas the guide track 50 arranged on the mass 42 is passed through from the right to the left. In so doing, the guide track 50 rotates in this view to the right, as a result of the forced movement by means of the control cam, whereby the yarn guide slide is slowed down.

The operation of the illustrated embodiment of FIGS. 13, 13A is as follows. Upon the entry of the yarn guide slide into the illustrated stroke end area, the lever 132 moves with its stop 23R into the control cam. When viewed in the traveling direction of the slide, it thus moves into the left-hand flank of the control cam. During its passage through the control cam, the lever 132 is forced, via the stop 23R firmly connected to it, into a rotating motion. This rotating motion effects, on the one hand, that the retaining spring 18 is first tensioned, until its line of action extends through the center of the axis of rotation 128. On the other hand, the lever moves with the sliding block 37 into the guide track, which is in a stopped position. Consequently, the force movement causes the mass 42 to be set into motion, by reason of the sliding block 37 moving along the guide track 50. As can be seen in the top plan view of FIG. 13, i.e., when viewed in the direction of the axis of rotation 29, the control cam and the guide track form first a gap of a width decreasing toward the stroke end. When the slide arrives in the right-hand stroke end, the stop has reached the lowest point of the symmetrical control cam 33.1. Simultaneously, the mass 42 is so far rotated that the illustarted wedge gap exactly overlies the control cam with its lowest point. The mass 42 has then its highest rotational speed and thus its greatest kinetic energy. The slide has zero speed at this point. The mass continues its rotating motion and becomes now operative on its part on the sliding block 37 while changing the side of contact, whereby the lever 132 is further rotated in the same direction. Now, the line of action of the spring 18 is on the other side of the axis of rotation 128. The control cam prevents the movable clamp 12 from contacting the lower belt run with its corresponding flank, before the kinetic energy stored in the rotatable mass 42 is entirely returned to the yarn guide. As will be understood, the gap increases its width after the stroke end is passed. It is easy to imagine that during a stroke change the star is indexed by one arm, whereby its new end position is the same as shown. Likewise, the indexing disk is rotated by one recess. As a result the star assumes its precisely defined end position for the next stroke change, since the stop control lies with its end engaging the recess in the deepest point of the recess, or is pushed into the recess by the pressure spring of the stop control.

Figure 14:
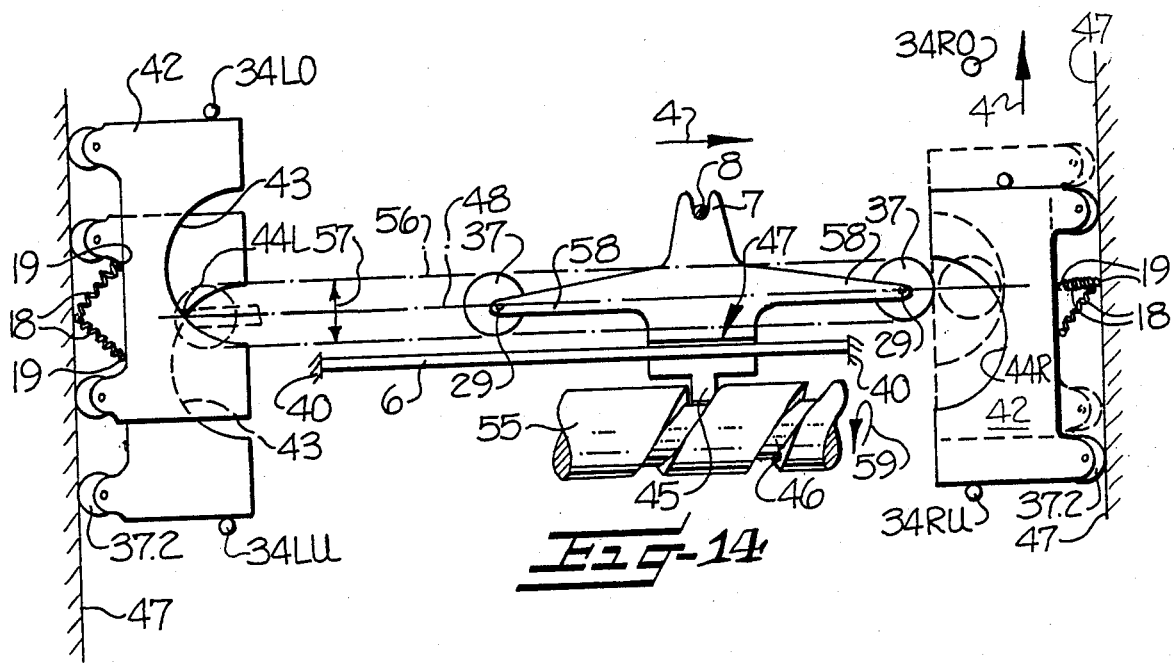

Other than in the foregoing embodiments of the energy accumulator, FIG. 14 shows masses 42 which are movable perpendicularly to the axis of motion 48 of the yarn guide 7 in a straight line, with guide tracks having the shape of a semicircular edge. The masses are movable in roller bearings 37.2 along a transverse guideway 47, and they are held in their end position by springs 18, respectively, against the stop 34 RO; 34 RU; 34LO; 34LU, with the springs overtraveling their dead center in the stroke end 44 R, L. To this end, the spring perches 19 respectively located on the guideways 47 are arranged in such a manner that the lines of action of the springs extend in the stroke end 44 R, L respectively parallel to the outer lines of contact 56, in the present case perpendicularly to the guideway 47. A yarn guide 7 reciprocates between the stroke ends 44 R and 44 L, in an axial direction along a straight guideway 6. The straight guideway is mounted on holders 40. A drive pin 45 is driven by the rotating drive groove 46 of a continuously rotating cross-spiralled roll 55.

The cross-spiralled roll rotates in the direction 59, which results in the traveling direction 4 indicated above the yarn guide. Attached to the yarn guide is a longitudinal guideway 47, which cooperates with the straight guideway 6. The yarn 8 advances perpendicular to the plane of the Figure in a recess of the yarn guide. The portions of the yarn guide facing the stroke ends are constructed as guide heads 58, which each accommodate a roll 37 which is rotatably supported about an axis of rotation 29, and forms the sliding block for the guide track of the pertinent energy accumulator. The exit ends of the recess possess tangents, which each extend parallel to the axis of motion 48 of the yarn guide 7, and which are tangent to the outer contact lines 56 of the yarn guide path 57. In the area of the left-hand stroke end, a further embodiment is shown with two similar masses, which are movable oppositely to each other. In the illustrated view, the two masses overlie each other, and are each pushed by a spring 18 against the stops 34 LU and 34 LO, respectively. The masses result from dividing the mass arranged in the right-hand stroke end into halves. Their edges 43 having the shape of a circular segment, form a common slot, which is tangent to the outer contact lines 56 of the yarn guide path 57. In the dashed arrangement, the associated guide head 58 of the yarn guide is indicated in the left-hand stroke end 44L. In this position, the two masses exactly overlie each other, and their tension springs simultaneously overtravel their dead center.

The operation of the illustrated traversing system is as follows. Each of the rollers 37 operates as a sliding block, which interacts with an edge having the shape of a circular segment. The rollers contact the mass laterally from the deepest point of the edge parallel to the axis of movement 48, thereby slowing down the yarn guide, on the one hand, and setting the mass respectively into an accelerated motion, on the other hand. In so doing, the pressure springs are tensioned until the yarn guide reaches the stroke end 44R, L. In this moment the speed of the yarn guide is zero, and its kinetic energy is transmitted to the mass 42. The dashed arrangement illustrates the stroke end of the yarn guide. As a result of the speed of the mass, the spring is moved beyond its dead center, and it pushes the mass in the other end position against the other stop. After the yarn passes beyond the right-hand stroke end, the mass continues to move in the unchanged direction 4 upwardly toward the stop 34 RO. In so doing it returns its kinetic energy to the yarn guide until it is pushed by the spring 18 against the stop 34 RO. From now on, the yarn guide is moved along the guideway 6 in the opposite direction, and the procedure repeats itself analogously in the other stroke end. Also in the case of a continuously rotating drive, the energy storing means may be used in all embodiments. To this end, reference is made to the following description.

Figure 14A:
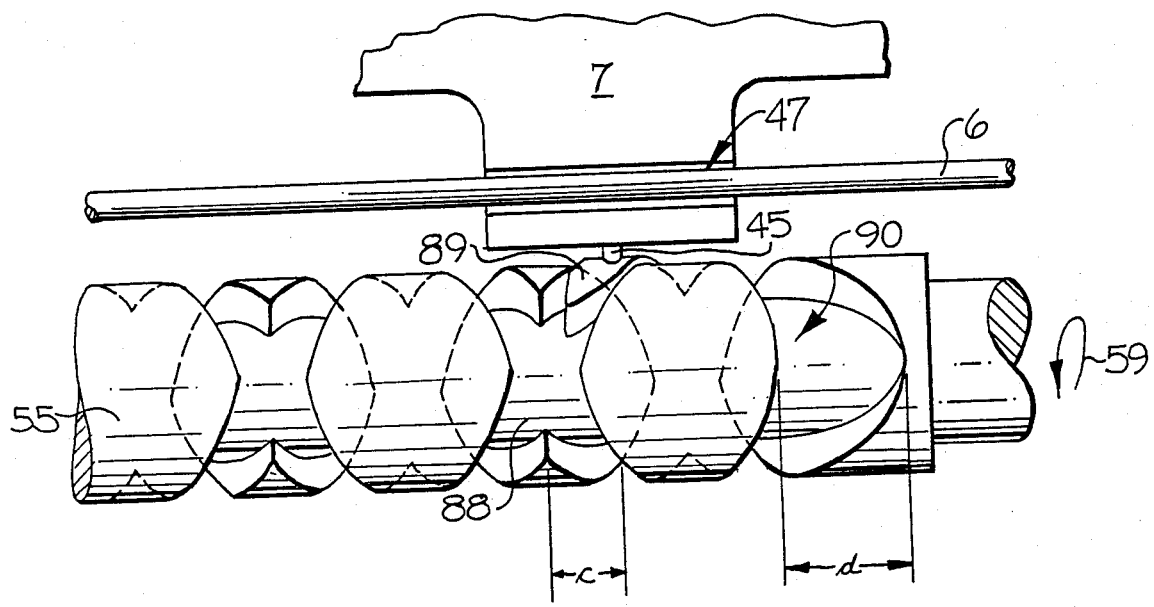
FIG. 14A is a fragmentary enlarged view of one end of the drive roll shown in FIG. 14.

FIG. 14A is a detailed view of the cross-spiralled roll of FIG. 14. The yarn guide 7 illustrated in a cutout view, is provided at its lower end with a drive pin 45, which accommodates a shuttle 89 rotatable thereon. The shuttle engages with the cross-spiralled groove 88. The cross-spiralled groove is recessed into an otherwise cylindrical roll body as a circulating groove with a width 1. Only one section of the cross-spiralled roll 55 is shown. It is driven on its right-hand end and continuously rotates in the direction 59. The width of the drive groove, in which the shuttle 89 moves, has on its illustrated right-hand end a widened portion 90, where the groove also has its largest width d, which is substantially greater than the width 1. As a result thereof, it is accomplished that in the area of the stroke reversal of the yarn guide 7, the shuttle is disengaged from the groove, and that the braking and accelerating forces are exerted on the yarn guide only by the movable masses 42.

There is no need to exactly harmonize the angular position and the extension of the drive groove with respect to the speed-traverse law of the yarn guide at the stroke reversal. Only slight forces should be applied by the drive groove 46 for the reversal of the shuttle 89. The reversal is assisted by the pointed ends of the shuttle.

FIG. 15 illustrates a traversing system for a yarn guide with a reversibly reciprocating belt drive. The yarn guide 7 is mounted on the slide 5 and reciprocated between the straight guideways 6. As illustrated, the slide 5 moves in the direction 4 toward the right-hand stroke end 44R. The left-hand stroke end is indicated at 44L. A rotating belt 1 is attached respectively on the right and the left side of the slide, guided over four deflecting pulleys 2 and driven via a belt pulley 73. Firmly connected with the belt pulley is the sliding block 37, which reciprocates along a circular path between the contact lines 56. Further provided on the belt pulley are an inner and an outer switching posts 65I, 65A. The belt pulley moves momentarily in the rotational direction 20. It is firmly connected with the drive shaft 61 of a motor 62. An axis of rotation 29 coaxial to the drive shaft accommodates two rotatably supported levers 66. On their outer periphery the levers are each provided with a gear tooth system 67, which engages with a similar gear tooth system of each drive worm 68. Each drive worm is rotatably supported in a schematically illustrated bearing 70, but cannot be axially displaced. By the actuation of an adjusting wheel 69, the two worms can be rotated in the two adjusting directions 69a. In so doing, the levers are rotated about the axis 29. Each lever further accommodates a circular disk 28 rotatable about an axis 29a. Still further, each lever accommodates an opening switch 63R, L, as well as a closing switch 64R, L with a time-delayed effect. A double line 71 proceeds from each individual switch to a common control circuit 72. Furthermore, three current phases R, S, T lead into the control circuit, from which three phases also leave. In the momentary position, the opening switch 63R of the right-hand support lever is actuated by the inner switching post 65I, while the time-delayed closing switch 64R has not yet been actuated by the outer switching post 65A.

The operation of the traversing system supplements the foregoing operations as follows. At the moment when the slide block 37 enters into the rounded edge 31 of the circular disk 28, the inner switching path actuates the opening switch 63R. As a result, a signal is transmitted to the control circuit, which disconnects the drive motor, i.e., same will then be in a free state of motion, together with the belt pulley 73 and the drive shaft 61. Shortly before the stroke end, the outer switching post 65A actuates the time-delayed closing switch 64R, whereby a time-delayed signal is emitted to the control line 72. The time-delayed signal causes, after the slide block 37 has passed the end of its path, i.e., when same moves already in the opposite rotational direction, the polarity of the motor 62 to be reversed, so that its driving direction changes. This operation repeats itself in the opposite stroke end, etc. The support levers are adjusted about the axis of rotation 29, via the adjusting worms 68, which can be rotated by the wheels 69, it being thereby accomplished that the stroke of the yarn guide can be adjusted in the meaning of a stroke modification also during the operation. In so doing, the respective switch points for reversing the drive direction of the motor can be displaced in the same direction at the same time.

FIG. 16 is a side elevation of a support lever with a detailed view of the opening and closing switches. The belt pulley 73 is fixedly connected for rotation with the motor drive shaft 61 via a gear tooth system 77. A shaft locking mechanism 79 secures the belt pulley in the interaxial direction. The drive shaft rotates momentarily in the direction 20. A rectangular groove 78 is formed in the periphery of the belt pulley, into which the belt 1 is placed. Coaxially arranged above the drive shaft is a bolt 80, which extends through a bore 82 of the holder 40. The bolt is clamped against its shoulder 83 by a hexagonal nut 81. The holder 40 is schematically illustrated, and it is stationary with respect to the drive shaft 61. The bolt 80 serves as a pivot bearing for the support levers 66 shown in a cutout view. Located respectively between the support levers and the holder is a spacer bearing 39. Approximately in the middle of the left-hand support lever 66, the circular disk 28 with a recess in the shape of a semicircular edge 31 is supported on the bolt 80. A spacer bearing 39 is likewise provided between the circular disk 28 and the support lever 66. The bolt is clamped by the hexagonal nut 81 against the support lever in such a manner that the circular disk is rotatable. The edge 31 cooperates with the sliding block, the latter entering, in its illustrated position, into the right-hand side of the edge 31. Further attached to the belt pulley 73 are the switching posts 65A and 65I, which actuate respectively the closing switch 64 and the opening switch 63. Both switches are pushed by pressure springs 18 in direction of their idle position against the switching posts 65A and 65I. Upon actuation, the contact plate 84 of the opening switch 63 opens the through connection of the pertinent control line 71, thereby interrupting the contact. The contact plate 84 of the closing switch 64, however, when actuated, closes the through connection of the pertinent control line 71. Both switches are accommodated respectively in a housing 85, which is screwed to the support lever.

Each control line extends in a bore through the support lever. The mechanism necessary for a time delayed closing is not shown in this illustration. However, it need not be contained in the closing switch, but can likewise be realized via an electric circuit. In the illustrated position the closing switch is actuated only a short time, but no switching connection is yet made. The course of the switching path in the circumferential direction is shown in FIG. 16A, which is a further detail vie of, for example, the switching post 65A in cooperation with the switch 64. The switch 64 is still on the leading flank 86 of the switching post. The closing contact in the upper areas 87 is kept closed. The actual closing of the contact occurs in the transition zone 86a.

Figure 17:
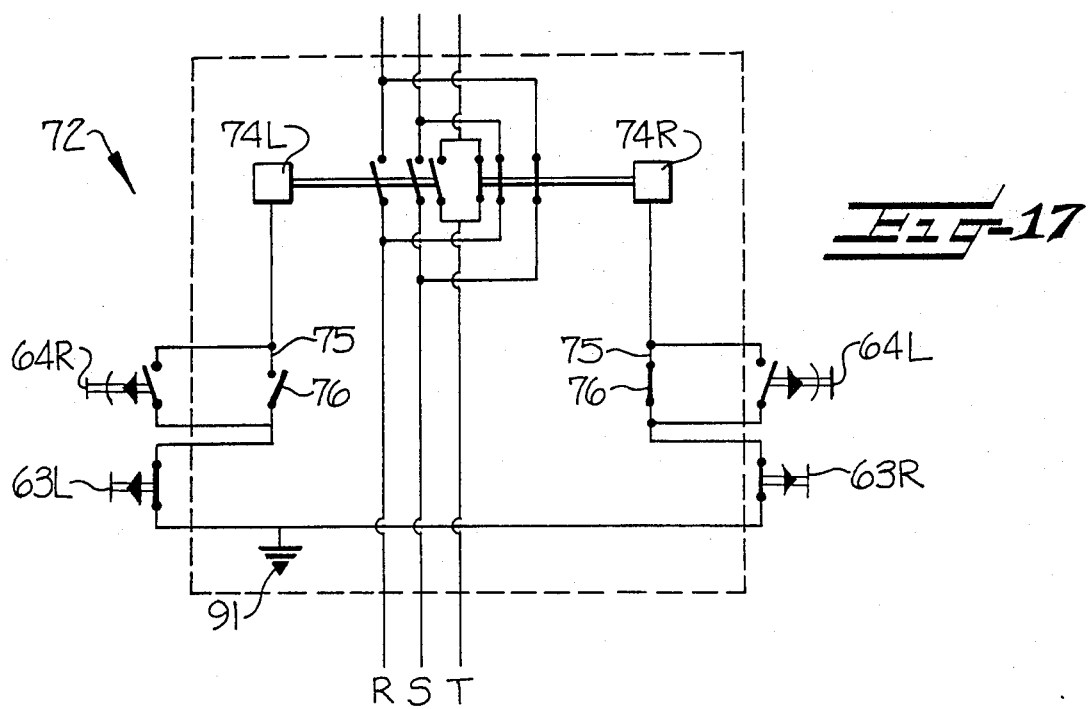
FIG. 17 is a schematic diagram of the electrical control circuit for the embodiment of FIG. 15.

FIG. 17 is a diagram of the control circuit 72 of FIG. 15. The dashed area corresponds to the dashed area of FIG. 15. Three current phases R, S, T enter into the control circuit at the lower end. The phase T is connected through until it leaves the control circuit on the opposite side. The phases R and S have each a connection to the input terminals of the relays 74L, R, the phases R and S leaving, in the illustrated switching position, the control circuit 72, one transposed with the other, since the current is switched via the relay 74R. One switch in each of the two relays is constructed as a holding switch 76, and the holding line 75 extends respectively parallel to the circuit of the time-delayed contact 64L, R.

The operation of the circuitry is as follows. In the illustrated switching position, the right-hand relay is energized and the phases R and S are transposed. This results in a certain rotational direction for the motor of FIG. 15. When the opening switch 63R is actuated, the relay 74R releases and the holding switch 76 opens, as do the other two relay-actuated switches, thereby interrupting the holding line 75. As a result no voltage is applied to the output of the control circuit, and the motor 62 is in a state of free motion. One moment later, the closing contact 64R is actuated, the closing function of which occurs with a time delay. The time delay is to be selected or adjusted at least so long that the switching function occurs only after the reversal of the motion. Upon closing, the relay 74L energizes, the phases R and S are connected through, and the pertinent holding contact 76 is actuated. The relay remains energized, even after the closing contact 64R reopens. As a result, the motor rotates in the opposite direction until the procedure repeats itself in the other stroke end. The two relays 74L, R are supplied by a source of voltage 91.

Figure 18:
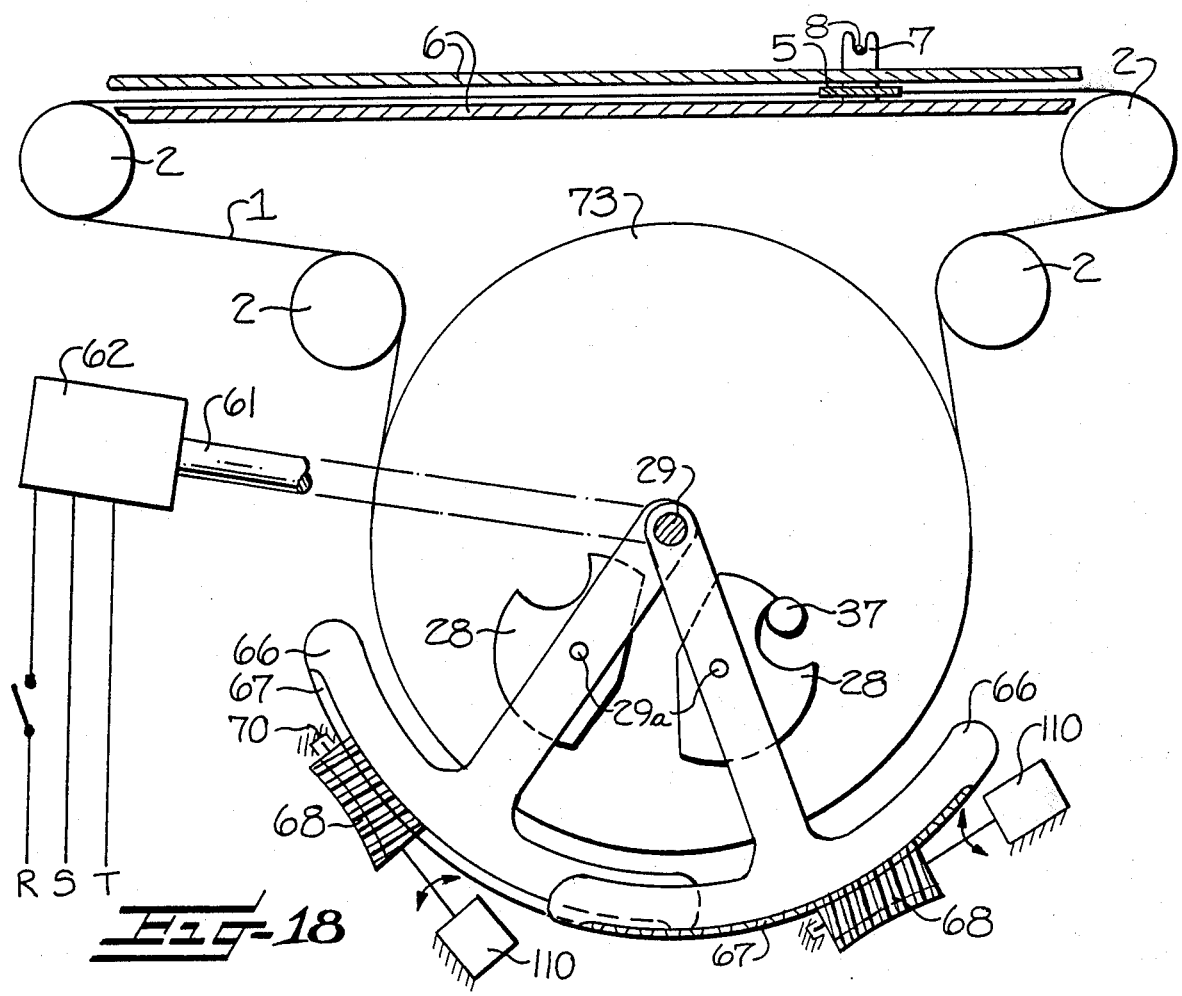

FIGS. 18 and 19 illustrate a belt drive, which differs in that the motor 62 drives the belt pulley 73 in the two possible rotational directions without a reversal. To this end the motor 62 is constructed as a three-phase a.c. motor, with only two phases remaining constantly connected. The third phase serves only to start up the traverse motion. The two motors 110 of FIG. 18 drive each the worms 68, thereby rotating the support levers 66 for the purpose of adjusting the stroke.

With regard to the remaining individual parts, which are not described here, reference is made to the foregoing description, in particular, the description of FIG. 15. The reversal of the drive direction does not occur, according to the following description of FIG. 19, in that the polarity of the motor is reversed, but by a forced reversal of the rotation by means of the circular disks.

FIG. 19 illustrates a yarn guide 7, which reciprocates between two straight guideways 6 along its stroke range. The stroke range is defined by the stroke ends 44L and 44R, respectively. The reciprocal motion occurs by means of an endless belt 1, which is guided over four deflecting pulleys 2 and contacts a partial circumference of the pulley 73. The pulley 73 is rotatably supported about the axis 29 and is driven by the drive shaft 61.

The drive shaft 61 is connected with a rotor 62a of a schematically illustrated three-phase motor 62. The motor possesses a stator 62b, the field coils of which are connected with the circuit R, S, T. As can be noted, out of the three phases, R, S, T of the circuit, only the phases R and S are connected through the stator coils of the motor, whereas the phase T has, via the open switch 64, no connection with the field coils. It is thereby accomplished that an identical sequence of current-carrying phases is generated in the field coils for the two possible rotational directions of the motor. The sequence of the phases is set as follows: R-S-R-S for both rotational directions. The energy storing means comprises two disks 28, which are rotatable between two end positions about the axes 29a on the supports 66. The supports may be rotatable about the axis 29 and undergo, for the purpose of adjusting the traverse stroke, a displacement 94 by a drive, as is shown, for example, in FIG. 18. Each disk accommodates two stops 47.1 and is held by the spring 18 in each end position against the pertinent support 66. In the end positions, the line of action of the each spring extends respectively on the other side of the axis of rotation 29a. It can be seen that, when the disk rotates from the one end position to the other, the line of action of the pertinent spring crosses the axis of rotation one time, thereby ensuring that each disk has always defined end positions. Each end position is thus determined in that the disk 28 with its stop 47.1 is held respectively by the pertinent spring 18 against the support 66. Formed into each disk is an arcuate recess 36, which forms on the disk a guide track for the sliding block 37. The sliding block 37 is firmly connected with the belt pulley 73, so that it moves along with the belt pulley 73. In so doing, the sliding block contacts each of the two energy storing disks 28 in such a manner that it moves into one end of the recess 36 substantially tangent thereto. As a result of the drive connection of the pulley 73 with the yarn guide 7, it is accomplished that, when the pulley rotates in the one of the two directions 20R, or 20L, the yarn guide performs respectively a straight-line movement 4R or 4L.

The operation is as follows: To start up the traversing system, the switch 64, which is, for example, an ON-key, is actuated for a short time, thereby starting the motor 62, which rotates the pulley 73, via the drive shaft 61, for example, in the direction 20R. After the switch 64 is opened, the motor maintains its running direction. As a result of the belt connection, the yarn guide is then moved in the direction 4R. The sliding block 37 moves simultaneously with the pulley 73 along its preset circular path. Shortly before reaching the right-hand stroke end 44R, the sliding block 37 moves into the pertinent open end of the guide recess 36. In so doing, it sets the mass of the energy storing disk 28 into motion, thereby braking the yarn guide 7 as a result of the drive connection. The spring 18 is tensioned, until its line of action passes across the axis of rotation 29a. In this moment, the yarn guide arrives exactly in its right-hand stroke end. Its speed is thus zero, whereas the disk 28 is brought to its maximum speed of rotation, i.e., its kinetic energy has now its highest value. The disk consequently continues to rotate in its momentary direction and, thus, becomes operative on the sliding block 37 with its guide recess 36 in the opposite direction, thereby reversing the pulley 73 to the rotational direction 20L and causing the motor 62 to change its running direction. As a result of the drive connection, the yarn guide is thus moved in the direction 4L toward its left-hand stroke end 44L. There, the procedure repeats itself analogously, and so forth. The yarn guide and all the parts which are moved along with same, are thus reciprocated while maintaining the kinetic energy, and without having to reverse the electromotive drive.

FIG. 20A illustrates a slide 5, which accommodates a yarn guide 7. The slide is axially guided between two straight guideways 6. Located above the two straight guideways is a stator 125 of a linear induction motor, which extends along the traversing system parallel to the straight guideways, and covers the guideways in part. The stator, which extends between the stroke ends, is not shown in the central area, so as to show the underlying slide 5. In each of the stroke end areas, a rotatable circular disk 28 is arranged on a support 66. The circular disks are located on the other side of the straight guideways, as can be seen in FIGS. 20C-D. The supports are adjustable respectively between the straight guideways 6 parallel to the traversing direction. To this end, reference should be made to the foregoing descriptions. The yarn guide slide 5 is simultaneously constructed as the rotor 126 of the linear motor. Up to this point, the description also applies to FIG. 20B. The two drives of the traversing system, however, differ in that the linear motor of the FIG. 20A is a three-phase rotary current motor, which remains constantly connected to three phrases, the polarity of respectively two phases being changed in the stroke reversal areas, so that the direction of the drive is changed. In the embodiment of FIG. 20B, the stroke reversal occurs according to the descriptions of FIGS. 18, 19.

The polarity of the drive motor of FIG. 20A is reversed in a manner comparable to FIG. 15. Upon the entry of the slide into the respective stroke end area, the right-hand switch 63 is actuated. The switch temporarily disconnected the linear drive. The slide moves with the sliding block 37, which is located on the other side of the straight guideways 6 (FIGS. 20C-D), into the recess of the circular disk and imparts its kinetic energy to the circular disk, while it is slowed down. After having passed beyond the stroke end, the slide is reversed in known manner by the circular disk to the opposite direction. When leaving the stroke end area, the switch 63 has changed the polarity of the linear motor, so that the direction of the drive is now reversed. Then the slide is driven right to the other stroke end, where the just-described procedure repeats itself analogously. The reversal basically occurs in the same manner as described in connection with the embodiments of FIGS. 15-17.

With regard to the details not shown here and pertaining to the construction of a linear induction motor, whose stator consists of successive field coils, reference should be made to the literature (for example, Draeger/Moczala, "Elektrische Linear-Kleinmotoren").

The following Figures illustrate further, differing embodiments of the movable mass.

FIG. 21 is a detail view of two, coaxially supported, movable masses, which are constructed as circular disks 28, from each of which a recess 36 is cut out in the shape of an arcuate segment. As a result of the curvature, the law of the motion reversal of the slide is defined. The recesses 36 are arranged symmetrically to the center line of the yarn guide path 57. The entering push rod 26 is provided with two guide heads and comprises in the illustrated view two overlying rollers 37, which are supported on an axis 29. The axis extends parallel to the axis of rotation, which intersects the center line perpendicularly. Clamped between a projection 33 or each circular disk is a common tension spring 16, which holds the circular disks in their idle position against a stop pin 34. When the disks are rotated, the spring overtravels its upper dead center and, in so doing, crosses with its line of action the axis of rotation. The circular recesses 36 form a common slot 31, the width of which decreases in the direction of the axis of rotation 29a. The slot width is so dimensioned that the rolls 37 can enter, free of shocks, in the direction 4, in tangential contact with the pertinent disk. Consequently, the recesses 36, which form respectively the guide track 32a of the circular disks, are, with their free ends facing the guide rolls 37, tangent to the path of the guide rolls 37 on both sides from the outside. The path 32 is defined by the outer contact lines 56.

FIG. 21A is a side elevation of an upper and a lower circular disk 28, which are supported on a common axis of rotation 29a. They are actuated respectively by an upper and a lower roller 37, which are coaxial and supported parallel to the circular disks. The tension spring 16 is clamped between the holding pins 38 and presses the circular disks from opposite sides against the stop pin 34. To reduce friction the circular disks are each provided with spacer bearings 39, both relative to the mounting support 40 and to each other.

FIG. 22 illustrates the cooperation between the yarn guide 7 and a rocking lever 15 with contact edges forming an angle greater than 180 degrees, as further described below. The yarn guide 7 moves in direction 4 toward the rocking lever 15, and the rocking lever is rotatably supported about an axis 29a. The axis of rotation perpendicularly intersects the axis of movement 48 of the yarn guide. The axis of movement is here identical with the center line of the surface, which is covered by the yarn on its travel. A cutout view of the guided yarn 8 is shown. The axis of rotation 29a is beyond the right-hand stroke end 44R. The yarn guide forms the stop for the rocking lever and does not pass beyond the axis of rotation. The rotational range of the lever is limited by the angular range 49. The opposite position of the lever is shown in dashed lines. Upon the entry of the yarn guide, the lever reverses in the direction 53. A circular cylinder 52 is arranged as an additional mass on the rocking lever, concentric to the axis of rotation, and rotates together with the lever 15. The contact path of the rocking lever is tangent to the circumference of the circular cylinder at the transitions 54, and extends between the transitions along the circumference of the cylinder. The contact lines 56 extend parallel to the axis of movement 48 and limit the length of the path 32a serving as a guide track.

Figure 23:
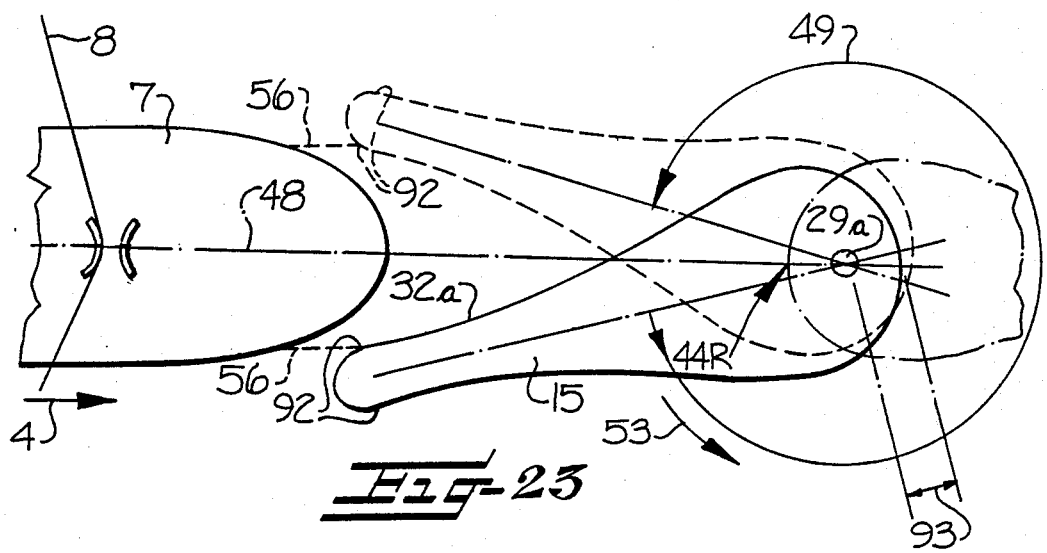

The illustration of FIG. 23 supplements that of FIG. 22 as follows: In the end positions of the rocking lever—i.e., the positions shown in both solid and dashed lines—the guide track 32a intersects the contact line 56 at a point 92. These intersections define the length of the contact edge of the rocking lever, i.e., each intersection is an end point of the contact edge. The distance of the contact edge from the axis of rotation 29a is greatest at a distance of the intersections 92 from the axis of rotation 29a. If the guide edge is traveled between the end points, the respective distance from the axis of rotation 29a will first decrease to a minimum value 93, and then increase to the maximum value. In the present arrangement, the minimum value 93 is arranged in the center between the intersections 92. In its dashed position, the rocking lever is shown in the stroke end of the yarn guide. Thus the guide track 32a of the lever 15 begins at the ponit of intersection with the lower line 56 on one side of the lever and extends around center 29a by an angle greater than 180° to the point of intersection on the other side of the lever.

Compared to the embodiment of FIG. 22, a special feature of this layout of a guide path is that there is no waiting time for the yarn guide in the stroke end. Thus, the different configuration of the guide path allows to differently influence the motion reversal of the yarn guide.

Figure 24:
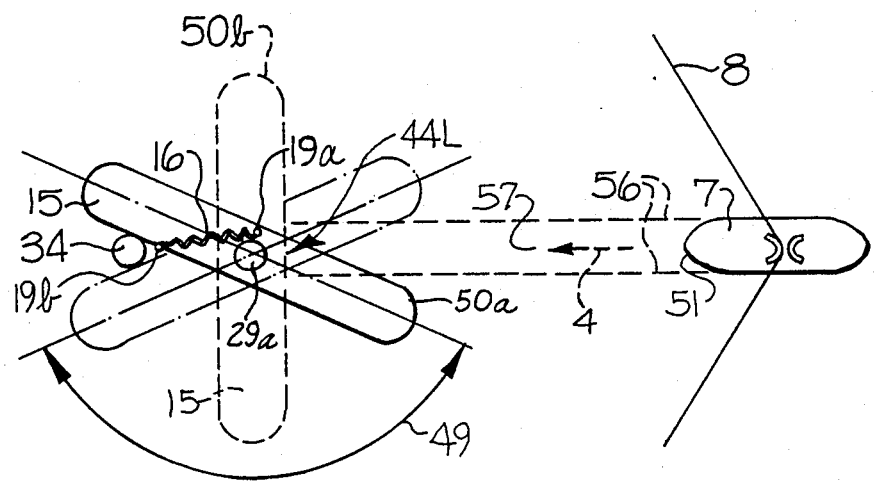
Figure 24A:
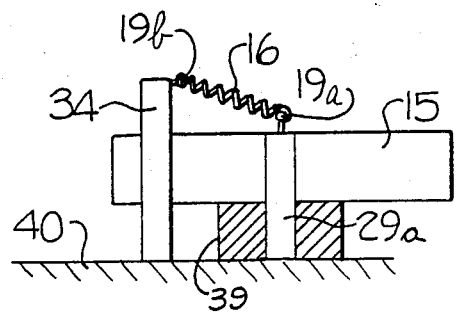
FIG. 24A, is a side view of the energy recovery mass of FIG. 24.

The illustration of FIG. 24 largely corresponds to the left-hand stroke end of the illustration of FIG. 25. In this embodiment, the rocking lever 15, which extends in a straight line between its ends, is held by a tension spring 16 against a stop pin 34 in the respective end position. The perch 19b of the tension spring is located on the rocking lever 15, this spring perch being so arranged that the spring pulls the rocking lever in its end positions against the stop 34, and that the spring reaches its greatest length, i.e., its dead center, in the center position 50(b) of the rocking lever. A schematic side elevation view is shown in FIG. 24A. As to its operation, reference should be made to the description of FIG. 25.

FIG. 25 shows a yarn traversing system with different rocking levers in the stroke ends. A yarn guide 7 moves in the direction 4 and guides a yarn 8. A rocking lever is arranged in the right-hand stroke end. Its axis of rotation 29a is within the stroke range, i.e., at a motion reversal it is overtraveled by the yarn guide serving as a stop for the mass. In its illustrated position, it is held by the pressure spring 18 against the lower pin 34. The spring possesses two perches 19, one being mounted on the rocking lever, and the other on the mounting support 40. It extends along the parallel to the contact lines which extend through the stroke ends 44R, L. As a result, the spring has it shortest length, when the yarn guide is in the right-hand stroke end 44R, and, consequently, has there its bottom dead center. The rocking lever is rotatable in an angular range 49, and rests against the opposite stop pin 34 at the end of the angular range. It has a concave guide track 50, which cooperates with the guide edge 51 of the yarn guide which faces same, as follows: Upon the entry of the yarn guide into the area of the contact edge 50, the guide edge 51 contacts the guide track 50 with its upper line of contact 56. The edges 51 and 50 slide along each other, thereby braking the yarn guide and setting the rocking lever into a rotating motion.

When the contact edge reaches the position 50(b), the yarn guide is in the stroke end 44R. At this moment, it has imparted its kinetic energy to the rocking lever. Same moves beyond the dead center of the spring, continues to move in its present rotational direction, and acts now on its part upon the yarn guide, which is thereby accelerated in the opposite direction. The yarn guide leaves the area of the stroke end, and the spring is pushes the rocking lever to its opposite end position 50(c).

In the opposite stroke end, a rocking lever of a different design is shown. The cooperation between the yarn guide and the rocking levers occurs in the same manner. However, a difference exists here in that the contact edge of the rocking lever extends now in a straight line between its ends. FIG. 25A is a cutout view of a side elevation. Each rocking lever is supported in a spacer bearing 39 which is positioned between the rocking lever and the mounting support 40. The dead center spring ls connects the right-hand rocking lever with the mounting support 40.

FIG. 26 illustrates a unilateral rocking lever 15, which is supported on an axis of rotation 29a. The rocking lever accommodates an eccentrically arranged sliding block 37, which is located, in the illustrated end position of the rocking lever, within the outer contact lines 56 of the yarn guide path 57. The yarn guide moves in the direction 4 toward the illustrated stroke end 44L. Its front end, which faces the stroke end and contacts the sliding block, is concavely curved, and forms the guide track for the sliding block. In the dotted line position, the yarn guide is at the stroke end, and the rocking lever in the center of its rotational range, which is defined by the angular range 49. After the yarn guide has left the area of the stroke end, the rocking lever assumes its idle position, which is shown in dashed lines, and is here symmetrical to the starting position. The contact edge of the yarn guide is concavely curved relative to the axis of rotation of the rocking lever, its greatest depth being located on the line of movement 48 of the yarn guide, which extends through the axis of rotation. The sliding block consists of a roller 37 supported on the axis of rotation 29.

Figure 27:
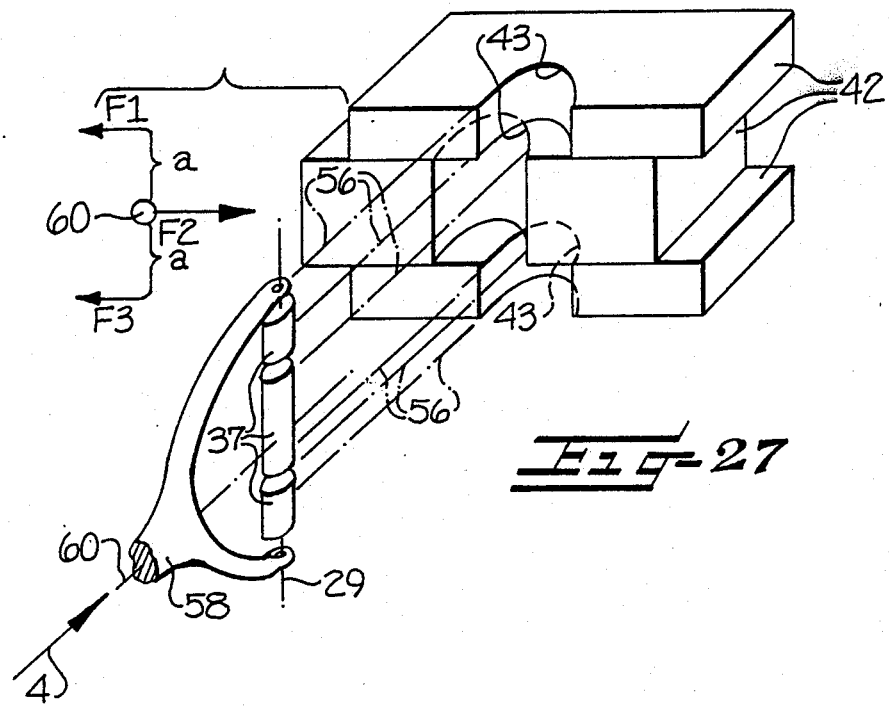

FIG. 27 illustrates an embodiment wherein the interaction of the guide head and the movable masses, and the transverse forces F1, F2 and F3, which act upon the guide head 58, compensate each other, as do the moments resulting from the forces about the axis 60, about which the moments rotate and which extends in the direction of movement 4. The guide head 58 has a forked enlargement and moves in the direction 4 toward the three masses 42. An axis of rotation 29 extending through the ends of the enlargement is schematically indicated, and it extends through three cylindrical rollers 37. The middle cylindrical roller is twice as long as the two adjacent, outer rollers. All cylindrical rollers have the same diameter. The contact lines 56 directed in the traveling direction 4 point into the rounded or concave edges 43 of the schematically illustrated masses. It can be noted that the contact lines enter tangentially into the concave edges. All concave edges have identical, cross-sectional dimensions. The intermediate mass is twice as large as each of the two outer masses. The masses are shown in the end position. Upon the entry of the guide head, the masses are displaced, from their illustrated end position, one oppositely to the other. This means that the two outer masses move in the same direction, whereas the intermediate mass moves in the opposite direction. This is effected by the forces F1, F2 and F3, which act upon the guide head in the opposite direction. As a result, rotary moments develop about the axis of rotation 60 of the guide head, which axis extends through the center plane of the intermediate mass. These rotary moments are calculated from the forces F1 and F2, each having the same distance of application 1. The moments rotate with respect to the axis 60 in the opposite direction, and therefore cancel each other. At the same time, it is accomplished by the size of the masses in connection with the similar, i.e., identical concave edges or guide tracks, that the resultant forces F1 and F2 are the same as the force F3. Consequently, the forces acting transversely to the guide head cancel each other.

Figure 28:
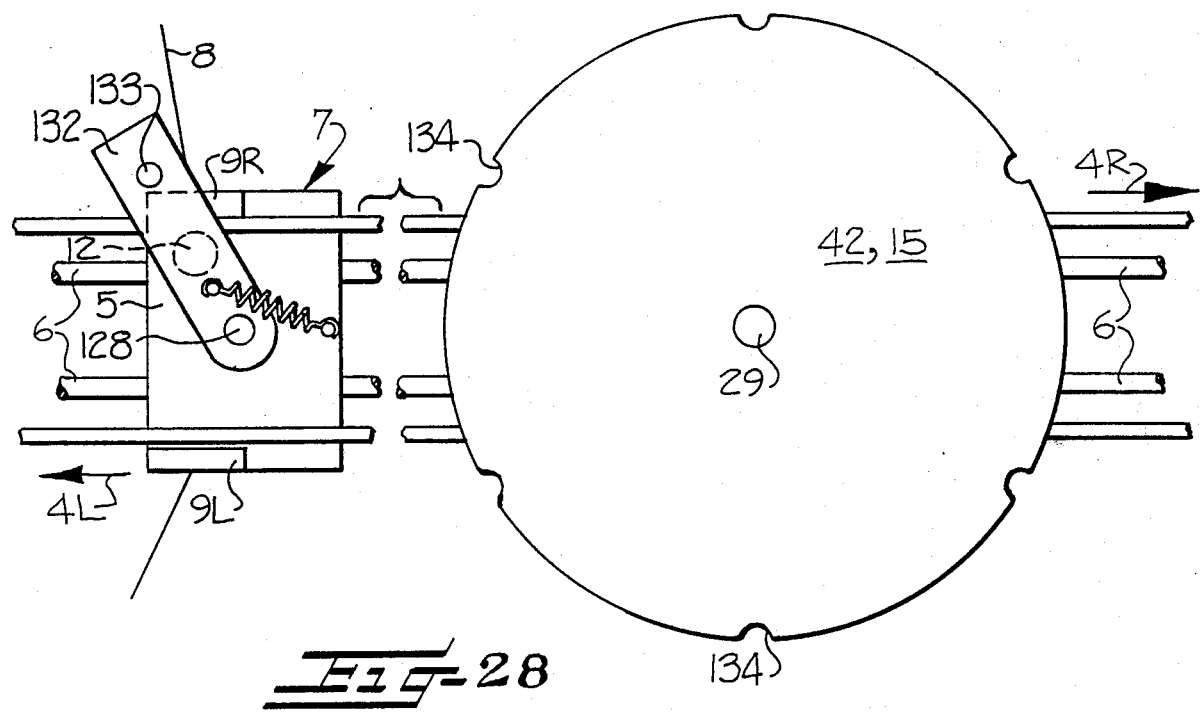

FIG. 28 illustrates another embodimett of the invention. It is shown by the example of a belt drive, how the storing mass 42 is connected by means of a drive connection for the gear mechanism with the yarn guide slide 5 serving as a stop. A lever 132 serves as such a drive connection which is rotatably supported about an axis 128. The special feature of this embodiment is that the drive connection cooperates at a motion reversal in positive engagement with the mass. To this end, the lever is provided with a pin 133, which positively engages in a notch 134 of the mass 42. Shown is only the arrangement for the illustrated stroke end. It can be imagined that when the lever 132 is rotated anti-clockwise, the pin passes along a circular segment, the radius of which is determined by the distance between the pin and the axis of rotation.

Between the two end positions of the lever 132, the connecting line of the two end positions of the pins forms a chord of the circular segment. The length of this chord corresponds to the distance between two successive notches 134 on the movable mass 42. The notches are provided on the periphery of the mass, each at the same distance from the other. They form a regular polygon, the side lengths of which are as long as the length of the chord.

Upon the entry of the slide to the end of the stroke path, the pin engages in the notch 134. While the slide moves on, the lever 132 is rotated anticlockwise, thereby disengaging the clamps 12, 9R, and the slide floats freely. Simultaneously with the rotation of the lever 132, the mass 42 is set into an accelerated motion. Same rotates anticlockwise and, in so doing, constantly exchanges energy with the yarn guide slide and the other guide means. While maintaining its direction of movement, the mass returns its stored kinetic energy to the yarn guide slide, after same has reached the stroke end. As a result, the yarn guide slide is reversed to the opposite direction. After the clamp 21 and the pertinent clamp 9L have engaged the lower belt run, the slide is guided into the opposite stroke end.

Supplementing the foregoing, in the present embodiment, the mass and the guide means are, during the energy exchange, in a constant positive engagement with each other, as a result of the cooperation between the notch and the pin with the stop.

Further supplementing the foregoing, the descriptions will also apply to cases, which are not shown, and in which the movable masses are not stationarily arranged, but are provided on one of the guide means, movable relative thereto, and the stops, which cooperate with the masses, are stationarily arranged instead.

In the drawings and specification, there has been set forth a preferred embodiment of the invention, and although specific terms are employed, they are used in a generic and descriptive sense only and not for purposes of limitation.

That which is claimed is:

1. A yarn traversing apparatus adapted for guiding a running yarn onto a rotating core to form a core supported package, and comprising
   a machine frame,
   yarn guide means including a yarn guide, means mounting said yarn guide means to said frame for back and forth movement along a stroke path, drive means for moving said yarn guide means back and forth along said stroke path, and energy recovery means for recovering the kinetic energy of said yarn guide means during its reversal of movement at each end of the stroke path, said energy recovery means comprising (a) mass means movably mounted to one of said frame and said yarn guide means, (b) contact means mounted to the other of said frame and said yarn guide means, and (c) cooperating surface means on said mass means and said contact means for providing a positive drive connection therebetween during each reversal of movement of said yarn guide means and so as to transmit kinetic energy from said yarn guide means to said mass means as the yarn guide means approaches each end of said stroke path to thereby impart movement to said mass means, and then retransmit the resulting kinetic energy from said moving mass means to said yarn guide means to thereby cause said yarn guide means to move away from each end of said stroke path.

2. The yarn traversing apparatus as defined in claim 1 wherein said drive means includes a stop positioned so as to be engaged by said yarn guide means upon reaching each end of the stroke path and for effecting reversal of the movement.

3. The yarn traversing apparatus as defined in claim 1 further comprising at least one lever arm pivotally mounted to one of said frame and said yarn guide means, and said mass means comprises a mass component of each of said lever arms.

4. The yarn traversing apparatus as defined in claim 3 wherein one of said lever arms is mounted to said frame adajcent each end of said stroke path, and said cooperating surface means includes a concave edge surface positioned on the side of each of said lever arms facing said yarn guide means, and a head mounted at each end of said yarn guide means for respectively engaging said concave edge surfaces of said lever arms.

5. The yarn traversing apparatus as defined in claim 3 wherein one of said lever arms is mounted to said frame adjacent each end of said stroke path, and said cooperating surface means includes a concave edge surface positioned on each end of said yarn guide means, and a follower on each of said lever arms for respectively engaging the concave edge surfaces of said yarn guide means.

6. The yarn traversing apparatus as defined in claim 1 further comprising at least one carriage mounted to said frame for linear movement in a direction perpendicular to said stroke path, and wherein said mass means comprises a mass component of each of said carriages.

7. The yarn traversing apparatus as defined in claim 6 wherein said cooperating surface means includes a concave edge surface positioned on each end of said yarn guide means, and a follower on each of said carriages for engaging the adjacent concave edge surface of said yarn guide means.

8. The yarn traversing apparatus as defined in claim 1 wherein the one of said mass means and said contact means which is mounted to said frame comprises a pair of members mounted adjacent respective ends of said stroke path, and further comprising control means for adjustably moving said pair of members for inward and outward movement relative to each other to thereby permit adjustment of the length of the stroke path.

9. The yarn traversing apparatus as defined in claim 1 wherein said drive means includes means for temporarily disconnecting said drive means at each of the ends of the stroke path.

10. The yarn traversing apparatus as defined in claim 9 further comprising means for accelerating said yarn guide means toward each of said ends of the stroke path while said drive means is temporarily disconnected.

11. The yarn traversing apparatus as defined in claim 1 wherein said drive means comprises a pair of laterally separated and parallel belt segments rotatably mounted on said frame, and means for driving said belt segments in opposite directions.

12. The yarn traversing apparatus as defined in claim 1 wherein said drive means comprises a drive roll having a cross-spiralled groove in the surface thereof, a shuttle mounted on said yarn guide means and operatively positioned in said groove, and means for continuously rotating said drive roll.

13. The yarn traversing apparatus as defined in claim 12, wherein said cross-spiralled groove includes a widened portion at each end thereof so as to effectively disengage said shuttle from said groove at each of the ends of the stroke path, and such that only the forces exerted by said energy recovery means are acting on said yarn guide means at the ends of the stroke path.

14. The yarn traversing apparatus as defined in claim 1 wherein said drive means comprises a reversible electric motor, and means for temporarily disengaging said motor at each of the ends of the stroke path.

15. The yarn traversing apparatus as defined in claim 14 wherein said reversible electric motor comprises a linear induction motor having a stator positioned along and adjacent the stroke path, and a rotor fixedly mounted to said yarn guide means.

16. The yarn traversing apparatus as defined in claim 1 wherein said drive means comprises a drive pulley, an endless belt entrained about a portion of the periphery of said drive pulley and having a segment thereof extending along said stroke path and affixed to said yarn guide means, and motor means for reversibly driving said pulley so as to reversely reciprocate said endless belt and yarn guide means.

17. The yarn traversing apparatus as defined in claim 16 wherein said machine frame includes a pair of levers, means mounting said levers so as to extend radially outwardly from the rotational axis of said drive pulley and in an angularly spaced apart relationship, and wherein said mass means includes a disk rotatably mounted to each of said levers, and said contact means comprises a slide block mounted to said drive pulley and positioned to alternately engage said disks.

18. The yarn traversing apparatus as defined in claim 16 further comprising switch means having a first component mounted to said drive pulley and a second component mounted to a component of said frame, for reversing said motor means at each end of the stroke path.

19. The yarn traversing apparatus as defined in claim 18 further comprising means adjustably mounting said frame component so as to permit adjustment of the position of said second switch component and thus the length of the stroke path 20. The yarn traversing apparatus as defined in claim 19 wherein said mass means includes a mass component movably mounted to said frame component, and said contact means comprises a slide block mounted to said drive pulley and positioned to engage said mass component, and such that the adjustment of the frame component acts to adjust the positions of both the second component of said switch means and the mass component.

21. A yarn traversing apparatus adapted for guiding a running yarn onto a rotating core to form a core supported package, and comprising
a machine frame,
a pair of laterally separated and parallel belt segments rotatably mounted on said frame,
means for driving said belt segments in opposite directions,
yarn guide means comprising a slide mounting a yarn guide, and belt gripper means,
means mounting said yarn guide means to said frame for back and forth movement along a straight line stroke path between and parallel to said belt segments,
means mounting said belt gripper means on said slide for movement between a first position engaging one of said belt segments and a second position engaging the other of aid belt segments,
control means for moving said belt gripper means from said first position to said second position at one end of said stroke path and returning said belt gripper means from said second position to said first position at the other end of said stroke path, and so that said slide and yarn guide are reciprocated along said stroke path, and
energy recovery means for recovering the kinetic energy of said yarn guide means during its reversal of movement at each end of the stroke path, said energy recovery means comprising
(a) mass means movably mounted to one of said frame and said yarn guide means,
(b) contact means mounted to the other of said frame and said yarn guide means, and
(c) cooperating surface means on said mass means and said contact means for providing a positive drive connection therebetween during each reversal of movement of said yarn guide means and so as to transmit kinetic energy from said yarn guide means to said mass means as the yarn guide means approaches each end of said stroke path to thereby impart movement to said mass means, and then retransmit the resulting kinetic energy from said moving mass means to said yarn guide means to thereby cause said yarn guide means to move away from each end of said stroke path.

22. The yarn traversing apparatus as defined in claim 21 wherein said control means comprises
a pair of stops mounted adjacent respective ends of said stroke path,
cam means mounted on said slide for movement between a first location and a second location and so as to be engaged by said stop at each end of said stroke path to thereby be alternately shifted between said first and second locations,
means operatively interconnecting said cam means and said belt gripper means suth that said belt gripper means is moved to said first position upon said cam means being moved to said first location, and such that said belt gripper means is moved to said second position upon said cam means being moved to said second location, and
spring biasing means fixed to said slide and to said cam means for biasing said cam means toward said first location when said cam means is in said first location, and for biasing said cam means toward said second location when said cam means is in said second location, and with said spring biasing means having a dead center position of maximum force when said cam means is intermediate said first and second locations.

23. The yarn traversing apparatus as defined in claim 22 wherein said belt gripper means comprises first and second pairs of clamps for engaging respective ones of said belt segments, with each pair of clamps comprising a first member fixed to said slide and a second member movably mounted on said slide for movement toward said first member and so as to engage the associated belt segment therebetween.

24. The yarn traversing apparatus as defined in claim 23 wherein said cam means comprises first and second curved spring blades mounting respective ones of said movable second members, and a cam pivotally mounted to said slide between said spring blades and so as to define said first and second locations, said cam including an arm which is configured to engage said stops at the ends of the stroke path and so that said cam is pivoted in alternate directions so as to be moved between said first and second locations and engage alternate ones of said spring blades in said first and second locations to thereby straighten the engaged blades and thereby move the associated movable second member toward the associated fixed first member.

25. The yarn traversing apparatus as defined in claim 24 wherein said spring biasing means comprises a spring which is tensioned and which is connected between said slide and said cam.

26. The yarn traversing apparatus as defined in claim 21 wherein said belt gripper means comprises a plate-like support overlying said slide, means mounting said support to said slide for movement in opposite directions along a path which is inclined from the lateral direction extending between said belt segments and so as to define said first and second positions, first and second pairs of clamps for engaging respective ones of said belt segments at said first and second positions, with each pair of clamps comprising a first member fixed to said slide and a second member mounted respectively on laterally opposite edges of said support.

27. The yarn traversing apparatus as defined in claim 26 wherein said control means comprises a pair of stops mounted adajcent respective ends of the stroke path, and an arcuate edge surface along each of the longitudinally spaced apart edges of said support, and wherein each of said stops is positioned for engaging the adjacent arcuate edge surface and thereby laterally translating said support.

28. The yarn traversing apparatus as defined in claim 27 wherein said control means further comprises spring biasing means fixed to said slide and to said support for biasing said support toward each of said first and second positions, and with said spring biasing means having a dead center position of maximum force when said support is intermediate said first and second positions.

29. The yarn traversing apparatus as defined in claim 21 wherein said belt gripper means comprises a plate-like support overlying said slide, means pivotally mounting said support to said slide for movement in opposite pivotal directions and so as to define said first and second positions, first and second pairs of clamps for engaging respective ones of said belt segments at said first and second positions, with each pair of clamps comprising a first member fixed to said slide and a second member mounted on said support.

30. The yarn traversing apparatus as defined in claim 29 wherein said control means comprises a pair of stops mounted adjacent respective ends of the stroke path, and follower means mounted on said support for engaging respective ones of said stops and so as to pivot said support between said first and second positions.

31. The yarn traversing apparatus as defined in claim 30 wherein said control means further comprises spring biasing means fixed to said slide and to said support for biasing said support toward each of said first and second positions, and with said spring biasing means having a dead center position of maximum force when said support is intermediate said first and second positions.

32. The yarn traversing apparatus as defined in claim 31 wherein said mass means comprises a mass component of said support, and wherein each of said stops includes a concave surface opposing said follower means, with each of said concave surfaces being positioned so as to engage said follower means and cause said support to pivot between said first and second positions.

33. The yarn traversing apparatus as defined in claim 21 further comprising means for accelerating said yarn guide means toward each of the ends of the stroke path to assure that said spring biasing means passes through its dead center position.

* * * * *

UNITED STATES PATENT AND TRADEMARK OFFICE
CERTIFICATE OF CORRECTION

PATENT NO. : 4,881,694

DATED : November 21, 1989

INVENTOR(S) : Klaus Bartkowiak et al

It is certified that error appears in the above-identified patent and that said Letters Patent is hereby corrected as shown below:

Column 9, line 32, delete ")."

Column 10, line 30, "n" should be -- in --

Column 14, line 66, after the third occurrence of "the" insert -- central area parallel between the belt runs. The right- --

Column 15, line 7, "Zshaped" should be -- Z-shaped --

Column 26, lines 18 and 24, "1" should be -- c --

Column 28, line 10, "vie" should be -- view --

Column 33, line 10, "1s" should be -- 18 --

Column 33, line 66, "1" should be -- a --

Signed and Sealed this

Fourth Day of June, 1991

Attest:

HARRY F. MANBECK, JR.

Attesting Officer

Commissioner of Patents and Trademarks